US011334779B1

(12) United States Patent
Schwarzberg

(10) Patent No.: US 11,334,779 B1
(45) Date of Patent: May 17, 2022

(54) DYNAMIC EMBEDDING OF MACHINE-READABLE CODES WITHIN VIDEO AND DIGITAL MEDIA

(71) Applicant: the dtx company, New York, NY (US)

(72) Inventor: David Benjamin Schwarzberg, Riverside, CT (US)

(73) Assignee: the dtx company, New York, NY (US)

( * ) Notice: Subject to any disclaimer, the term of this patent is extended or adjusted under 35 U.S.C. 154(b) by 0 days.

(21) Appl. No.: 17/576,231

(22) Filed: Jan. 14, 2022

(51) Int. Cl.
*G06K 19/06* (2006.01)

(52) U.S. Cl.
CPC .............................. *G06K 19/06037* (2013.01)

(58) Field of Classification Search
CPC ................... G06K 19/06037; G06K 19/06112
USPC .......................................................... 235/494
See application file for complete search history.

(56) References Cited

U.S. PATENT DOCUMENTS

| | | | | |
|---|---|---|---|---|
| 9,936,249 | B1* | 4/2018 | Nelson | H04N 21/4223 |
| 10,460,138 | B2* | 10/2019 | Barnum | G06T 11/60 |
| 2006/0196950 | A1* | 9/2006 | Kiliccote | G06K 19/06075 |
| | | | | 235/494 |
| 2007/0286455 | A1* | 12/2007 | Bradley | G06T 1/0064 |
| | | | | 382/100 |
| 2010/0128921 | A1* | 5/2010 | Alattar | G06T 1/0064 |
| | | | | 382/248 |
| 2012/0206648 | A1* | 8/2012 | Casagrande | H04N 21/4524 |
| | | | | 235/494 |
| 2013/0228624 | A1* | 9/2013 | Byrd | H04B 10/116 |
| | | | | 235/494 |
| 2015/0014417 | A1* | 1/2015 | Finlow-Bates | H04N 21/4722 |
| | | | | 235/494 |
| 2016/0148083 | A1* | 5/2016 | Osborne | G06K 7/1417 |
| | | | | 235/375 |
| 2016/0247423 | A1* | 8/2016 | Hohl | H04N 21/812 |
| 2019/0258814 | A1* | 8/2019 | Heeter | G06F 21/6218 |
| 2021/0287202 | A1* | 9/2021 | Fowler | G06Q 20/321 |
| 2021/0334490 | A1* | 10/2021 | Luk | G06K 7/1456 |

OTHER PUBLICATIONS

"Understanding Screen Resolution in the Context of Responsive Design," www.https://1902software.com/blog/screen-resolution, Jul. 229, 2020.
Manuel Moerbach, "How Digital Advertising Will Change in 2021," https://www.newsweek.com/how-digital-advertising-will-change-2021-1565525, Newsweek Digital LLC, Jan. 29, 2021.

(Continued)

*Primary Examiner* — Paultep Savusdiphol
(74) *Attorney, Agent, or Firm* — Weiss & Arons LLP

(57) ABSTRACT

This disclosure relates to technology for embedding machine-readable labels ("MRLs") into digital media files. Digital media files may be presented on different screen sizes, having different resolutions, different frame refresh rates and other display properties. Each screen may therefore present an MRL differently, potentially negatively impacting scan-ability of the presented MRL. Systems disclosed herein receive a set of design choices for an MRL. The systems may resize pre-existing content in one or more video frames of the media file and create a space within each video frame for displaying the MRL. The systems may render a resultant video file for a target screen size that includes a reliably scannable MRL embedded in the video frame(s).

30 Claims, 24 Drawing Sheets

(56) References Cited

OTHER PUBLICATIONS

Krisztina Szerovay, "Designing for Different Screen Sizes and Devices," https://uxdesign.cc/designing-for-different-screen-sizes-devices-part-1-47e6e481abde, UX Collective, Mar. 27, 2020.
"Frame Rate: A Beginner's Guide," https://www.techsmith.com/blog/frame-rate-beginners-guide/, TechSmith Corporation, Mar. 2017.
Chris Coke, "How to Calibrate Monitor: Setting up your Display for Gaming," https://www.ign.com/articles/2019/09/16/monitor-calibration-how-to-calibrate-monitor, IGN Entertainment, Inc., Sep. 16, 2019.
"Aspect Ration of the Video Frame," https://www.andrew.cmu.edu/user/1shea/2.Tech_PDFs/Pixel_Fun_Aspect-NonSquare.pdf, Apple Inc., 2010.
"Print Resolution: What Is It and Why Is It So Important," https://www.chillprintina.com/Online-Printina-Blog/print-resolution/, Gelimas. Chilli Printing, Inc., Dec. 29, 2017.
"Screen Sizes and Breakpoints," https://docs.microsoft.com/en-us/windows/apps/design/layout/screen-sizes-and-breakpoints-for-responsive-design, Microsoft Corporation, Oct. 4, 2021.
David Weedmark, "The Advantages of TV Advertising Vs. Print Advertising," https://smallbusiness.chron.com/print-media-advertising-advantages-3393.html,. Hearst Communications, Inc., Feb. 18, 2021.
Mike Vorhaus, "Traditional TV Advertising is Growing-Unlike Newspapers," https://www.forbes.com/sites/mikevorhaus/2020/11/29/traditional-tv-advertisina-is-growingunlike-newspapers/?sh=79d542167ee3, Forbes Media LLC, Nov. 29, 2020.
Neha Surana, "Video Resolutions: What Are They, Different Types, and Their Pixel Size," https://./typito.com/blog/video-resolutions/, Typito, Inc., Nov. 27, 2020.
"What is Refresh Rate and Why Is It So Important," https://www.intel.com/content/www/us/en/gaming/resources/highest-refresh-rate-gaming.html, Intel Corporation, Retrieved on Nov. 7, 2021.

\* cited by examiner

DYNAMIC EMBEDDING OF MACHINE-READABLE CODES WITHIN VIDEO AND DIGITAL MEDIA

FIELD OF TECHNOLOGY

This disclosure relates to dynamically generating a machine-readable label ("MRL") and embedding the MRL into a video file.

BACKGROUND

MRLs may include Quick Response ("QR") codes, Aztec codes, ShotCodes, SPARQCodes and any other suitable two-dimensional matrix barcodes. MRLs may include one-dimensional (e.g., linear) or three-dimensional machine-readable codes. MRLs provide businesses with a fast and efficient medium for connecting with consumers. Instructions may be encoded in an MRL. The instructions may include a uniform resource locator ("URL"), contact information or any other information. A scanning device is needed to scan and interpret the instructions encoded in an MRL. When a scanning device scans the MRL, the scanning device may extract the information encoded in the MRL. For example, the scanning device may be directed to the URL encoded in the MRL. Businesses may wish to leverage a MRL to guide consumers to a desired destination (real or virtual) where the customers can access products, services and information provided by the business.

In 2010, 62.6 million people in the United States used smartphones. During the 2020's, that number is predicted to more than quadruple to 272.6 million. Commensurate with increased smartphone use is integration of technology into smartphones that automates scanning and interpretation of an MRL. Today, many smartphones include a native camera application that recognizes MRLs such as QR codes. There is no need to download and install a separate application or use a specialized scanning device to scan an MRL and extract the encoded information.

MRLs potentially offer an inexpensive means of providing consumers with easy access to products, services or information. Consumers are already using their smartphones to search for information about a product/service of interest. Now, businesses can tap into this tendency by using MRLs to guide consumers to targeted content associated with a product/service. Furthermore, MRLs are inexpensive and easy to print on a variety of surfaces such as business cards, product packaging, posters, stickers or any suitable marketing materials.

Despite proliferation of mobile devices, widespread adoption of MRLs still faces significant hurdles. Conventionally, MRLs are reliably scannable when the MRL is printed on a physical, tangible medium. However, today much information is disseminated in digital form and MRLs are not as reliably scannable when presented within digital media or on electronic screens.

For example, an MRL may be displayed differently by different electronic devices. A mobile device may present an MRL on a 5-inch screen, while a TV may present the same MRL on a 42-inch screen. Each screen may present a MRL in a different size, different resolution, frame refresh rate and using a variety of different display properties. The numerous possibilities associated with electronic presentation of a MRL poses a technical challenge to generating MRLs that are reliably scannable when displayed within digital media.

Additionally, integrating MRLs into digital media is itself technically challenging. An MRL alone typically does not convey meaning to a human viewer. The viewer must understand the meaning or significance of an MRL based on context. For example, an MRL may be displayed alongside a product and educational instructions to scan the MRL to obtain more information about the product. Additional, when presented within a video frame, the MRL and associated educational instructions may obscure other digital content included in the video frame. Decreasing the size of the MRL may further exacerbate the technical challenges of electronically presenting a reliably scannable MRL.

Furthermore, digital media allows information to be rapidly disseminated to large numbers of viewers. The same content may be distributed by multiple content providers to a myriad of viewers. The ease of dissemination increases the number of viewers that may scan an MRL. The large number of viewers presents a technical challenge to identify a source of MRL scans. For example, it is technically challenging to discern which content provider has generated more or less viewer scans of an MRL embedded in the distributed digital media. Similarly, in the digital media environment, identifying an individual viewer who has responded to an advertisement is technically challenging.

It would be desirable to provide a system for generating MRLs that are reliably scannable when presented electronically such as within a video file. It would also be desirable provide a system that embeds generated MRLs into digital media. It would also be desirable provide a system that embeds generated MRLs into digital media without obscuring other content in the digital media. It would also be desirable to provide a system that generates MRLs that when scanned are associated with a specific instance of digital media and distributed using a specific channel or by a particular content provider. Accordingly, it is desirable to provide apparatus and methods for DYNAMIC EMBEDDING OF MACHINE-READABLE CODES WITHIN VIDEO AND DIGITAL MEDIA.

BRIEF DESCRIPTION OF THE DRAWINGS

The objects and advantages of this disclosure will be apparent upon consideration of the following disclosure, taken in conjunction with the accompanying drawings, in which like reference characters refer to like parts throughout, and in which.

DETAILED DESCRIPTION

Figure 1:
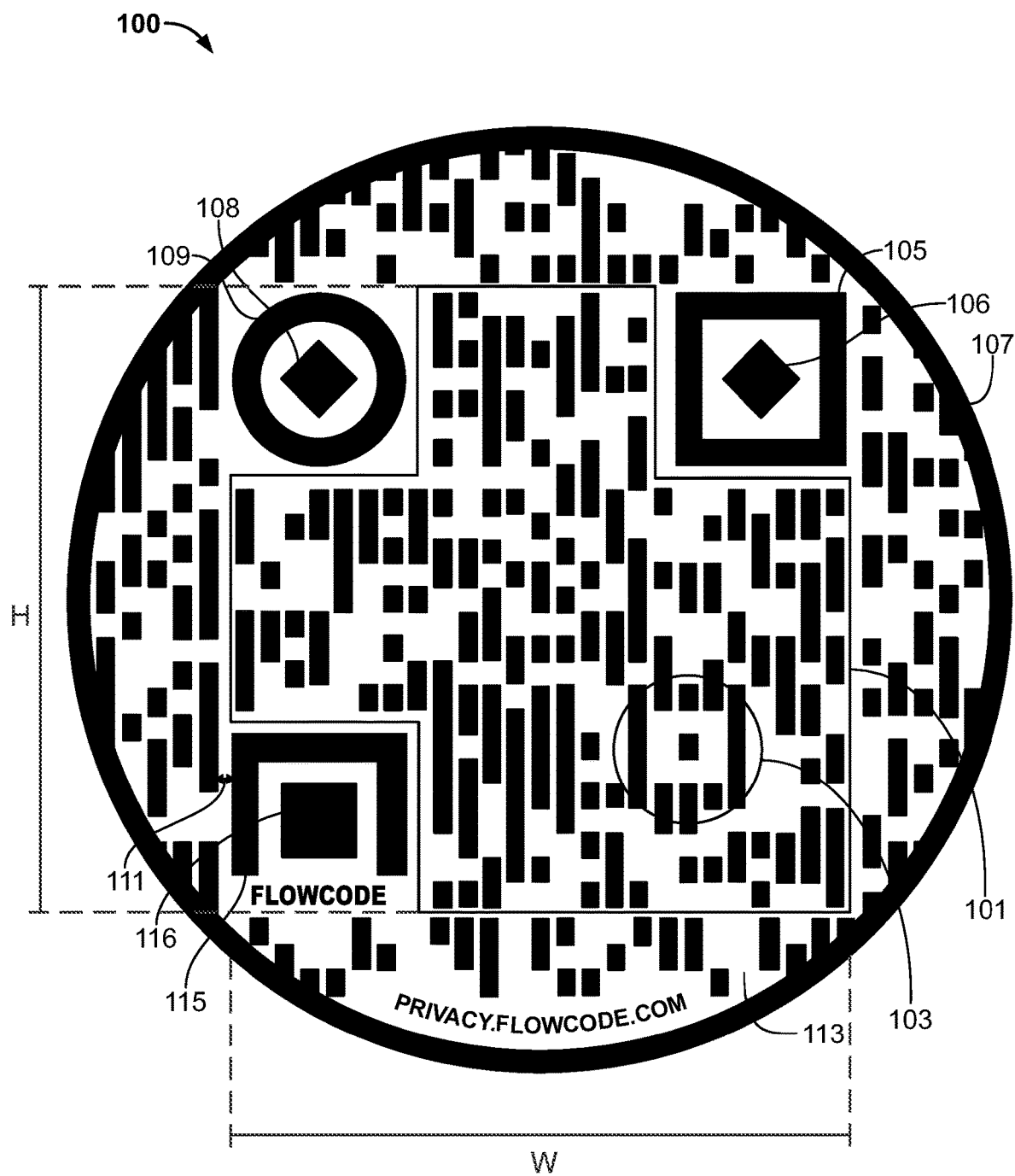
FIG. 1 shows an illustrative machine-readable label in accordance with principles of the disclosure.

A MRL may include a plurality of modules. A module may be a dark module or a light module. A scanning device, such as a smartphone, may be configured to interpret instructions encoded by a pattern of light and dark modules. For example, the scanning device may interpret the pattern of modules as a binary encoded message. A light module may represent a 0, and a dark module may represent a 1. A dark module may represent a 0, and a light module may represent a 1.

A device that captures information encoded in a MRL may be referred to herein as a "scanning device." An illustrative scanning device may be a laptop, tablet, smartphone, other "smart" devices or any other suitable device for capturing, receiving, storing, transmitting and/or displaying electronic information.

Information encoded in a MRL may be captured optically, using a camera of a scanning device. The information encoded in an MRL may be captured in any suitable manner. Methods may include using any suitable technology or protocol for capturing information encoded in an MRL. For example, the encoded information may be captured using near field communication ("NFC"), Bluetooth or 5G communication between the MRL and a scanning device. Any suitable technology or method for capturing information encoded in a MRL may be referred to herein as a "scan" of the MRL.

Methods for embedding a machine-readable label ("MRL") into a video file are provided. Methods may include uploading a video file to a remote computer server. Methods may include uploading a video file to a cloud computing environment. The video file may be any suitable length. Methods may include detecting an upload of a video file to a remote computer server. Methods may include integrating with a software platform for creating video files. Methods may include locating a video file creating using the software platform and inserting a MRL into the located video file. Methods may include connecting to a live video stream. Methods may include inserting an MRL into the live stream in real-time.

Methods may include receiving a set of design choices for an MRL. Exemplary design choices may include shapes, colors, color gradients and shading of one or more modules of the MRL. Exemplary design choices may include luminance, contrast, shape, intensity, edges, and sharpness of modules within an MRL. Exemplary design choices may include animations overlayed on top of or positioned underneath modules of an MRL.

Modules within a QR code or other MRL may define a data zone, a position detection pattern, a timing pattern, an error correction level and error correction code. Exemplary design choices (e.g., shapes, colors, color gradients and shading) may be applied to one or more modules of a data zone. The data zone may include machine readable instructions that, when scanned, triggers an action on a scanning device. For example, the data zone may encode instructions for launching a webpage or text message application. The instructions encoded in the data zone may prefill a destination field of the text message or insert text into the body of a message. The instructions encoded in the data zone may trigger a display of information on the scanning device such as a product identifier or instructions on how to use the product. The more information included within the data zone, the more modules will be needed to encode that information (e.g., a higher density data zone).

Exemplary design choices (e.g., shapes, colors, color gradients and shading) may be applied to one or more modules of an environmental zone of the MRL. The environmental zone of a MRL may include marks or designs that are not intended to be interpreted by a scanning device. The environmental zone may provide a MRL an aesthetic appearance that is different from a standardized appearance of a QR code. A standardized appearance of a QR code may be defined by one or more standards published by the International Organization for Standardization (ISO) of Geneva, Switzerland. Illustrative standards published by the ISO include ISO/IEC 18004:2015 and ISO/IEC 24778:2008 which are hereby incorporated herein by reference in their entireties.

Exemplary design choices (e.g., shapes, colors, color gradients and shading) may be applied to one or more modules of a position detection pattern of the MRL. A position detection pattern may include one or more modules that define a position marker (an "eye") of an MRL. The position marker may include modules arranged in a specific formation. A MRL may include position markers at one or more corners of the data zone. A MRL may include position markers at one or more borders of the data zone.

A scanning device may locate the data zone by detecting the position markers. A position marker is designed to include an arrangement of modules unlikely to appear elsewhere within other zones of an MRL. Illustrative design choices for each position marker included in a position detection pattern may include:

- a color of light modules included in the position marker;
- a shape defined by light modules included in the position marker;
- a shape defined by an outer border of dark modules of the position marker;
- a shape defined by dark modules within the outer border of the position marker;
- a color of dark modules that define the position marker;
- a color gradient applied to modules included in the position marker; and/or
- image(s) or logo(s) displayed within the position marker.

A position detection pattern may include one or more alignment markers. An alignment marker may allow a scanning device to locate the data zone despite displacement of the MRL relative to the scanning device, such as when the MRL is bent or curved. A position detection pattern may include one or more modules that define a timing pattern of the MRL. A timing pattern may include alternating dark and light modules. Timing patterns enable a scanning device to determine dimensions of a single module within the data zone. The arrangement of modules within the timing pattern enables a device scanning the MRL to follow a sequence for reading the executable instructions encoded in the data zone.

Exemplary design choices may include animations such as an animated GIF file. An animation may be integrated into an image file of an MRL. An animation may be applied to specific modules of an MRL. For example, an animation may be applied to a border of the MRL (e.g., environmental zone). An animation may be applied to a data zone of the MRL or any other component of an MRL. An animation may be applied to an MRL for a defined duration of time. An MRL may be reliably scannable even after being integrated with an animation.

Methods may include generating an MRL that includes the user input design choices and has a target error correction level. For example, methods may include generating an MRL based on the user input design choices that includes error correction code for restoring at least 15% of instructions encoded in the MRL's data zone.

Methods may include defining a segment of a video file. Methods may include defining two or more segments of a video file. In some embodiments, methods may include extracting the segment. The segment may be defined based on playback time relative to a start, end or duration of the video file. The segment of the video file may be defined based on content that is displayed within the segment. For example, the segment may include display of a product or service available for purchase. A user may wish to embed an MRL or other added content into the segment to allow viewers to scan the MRL and access additional information about the product or service.

A digital video file may be defined by a series of still images. To the human eye, when the still images are viewed at a threshold speed give the appearance of motion. Each still image in the series may be termed a video frame. A video file may include multiple video frames. Each video frame may define an area (e.g., length/width) and includes content that corresponds to visual properties of the still image. For example, the content may include a color associated with each of the pixels that collectively define the still image. The speed at which video frames in a video file are presented on a screen is the "frame rate."

Frame rate impacts the experience of viewing a video file. Different frame rates provide different viewing experiences. Choosing a frame rate requires consideration of multiple factors, such as how realistic the video should look or whether or not the video file will include slow motion or motion-blur effects. For example, typical movies are presented at frame rates of 24 frames per second ("fps") meaning that 24 still images (or video frames) are displayed for each second of the video file. A frame rate of 24 fps is similar to how humans perceive the world and tricks the human brain into perceiving smooth, realistic motion.

Live videos or video files that include a lot of motion, such as sporting events or video game recordings, often have higher frame rates to better capture details at any given moment. A higher frame rate keeps the motion smooth and details crisp. Because a video file associated with a higher frame rate includes more still images per second, the size associated with such a video file will be relatively larger than a video file associated with a lower frame rate. For example, animated GIFs typically use a lower frame rate, sacrificing detail for a relatively smaller file size.

Choosing a frame rate that is too high, may cause the playback of the video file to show too much detail and look unnatural to a viewer. Choosing a frame rate that is too low, causes playback of a video file to look choppy and provides a poor viewing experience. As a point of reference, video files produced for distribution to television viewers are typically between 24 and 30 fps. This frame rate ensures playback of the video files look realistic and meet viewer's visual expectations. Live broadcasts, such as news and sporting events, may be associated with a frame rate of 30 fps.

Each video frame has a size. The size of a video frame is typically defined by a ratio of horizontal to vertical dimensions of the video frame. The ratio is referred to as an "aspect ratio" and is independent of the absolute image size or resolution associated with the video frame. Illustrative aspect ratios include 1:1 (square), 4:3 (standard video screen), 16:9 (widescreen) or 2.4:1 (ultra-widescreen).

Methods may include defining a space within a video frame. In some embodiments, a space within a video frame may be defined relative to a size of the video frame, without regard to whether the space overlaps content included in the video frame. Dimensions of the space may be defined by a user. The space may be defined based on a template selected by a user. The space may define borders of an overlay that will be inserted into a video frame. The space may not extend outside a perimeter of a video frame.

The space may be defined using an artificial intelligence algorithm that assesses pre-existing content within a video frame. Such an assessment may include defining an aesthetic appearance associated with pre-existing content in a video frame. For a video frame, the artificial intelligence algorithm may identify background and foreground aspects of pre-existing content included in the video frame. The artificial intelligence algorithms may define a space that has threshold dimensions (e.g., width, length, total area) and minimizes overlap with pre-existing content in a video frame or segment of video file. The artificial intelligence algorithm may maximize dimensions of the space and minimize overlap with pre-existing content. Minimizing overlap with pre-existing content may include minimizing overlap with identified foreground content.

The artificial intelligence algorithm may determine a location for the space within a video frame. The location may be determined based on maximizing dimensions of the space and minimizing overlap with pre-existing content. The artificial intelligence algorithm may maximize dimensions of the space based on a size of a target MRL that is expected to be embedded in the space. The target MRL may be an MRL that is reliably scannable from a threshold distance when displayed on a target size screen.

The artificial intelligence algorithm may determine dimensions for the space based on pre-existing content within a video file. Generating the space may include detecting two or more content layers in a video file. For example, a video file may include at least one video frame that includes a first layer of content and a second layer of content. The first and second layers may collectively provide a "squeezeback" viewing effect. The squeezeback viewing effect may include a first layer of content (e.g., movie content or linear television content) displayed simultaneously alongside a second layer of content (e.g., siderail content). The first layer of content may occupy a first section of a video frame and the second layer may occupy a second section of the video frame.

Methods may include detecting a one or more of the content layers in a video file. Methods may include creating the space based on one or more of the detected content layers. Methods may include creating the space based on dimensions of a detected content layer. For example, a detected layer may occupy less than all the area of a video frame. Methods may include dividing the space into two or more sections. Each of the created sections associated with a space may be independently editable.

In some embodiments, methods may include resizing a segment of a video file to create a space within a video frame. Methods may include resizing the segment of the video file to create a space within a video frame included in the segment. Resizing a segment of a video file may include shrinking pre-existing content included in the segment. The pre-existing content may be resized such that a space created within each of the video frames that make up the segment do not obscure pre-existing content presented within each frame. Resizing a segment of a video file may include enlarging pre-existing content included in the segment. The pre-existing content may be an image, text or any suitable information.

In some embodiments, methods may include inserting a space into a video frame. The space may be positioned within a video frame on top of pre-existing content included in the video frame. The space may obscure a viewing of pre-existing content included in the video frame. An opacity of the space may be adjusted to allow for the underlying pre-existing content in the video frame to remain visible after the space is inserted into the video frame.

The space may extend along a length of the video frame. The space may extend along a width of the video frame. The space may extend along a width and length of the video frame. The space may have a circular area, a rectangular or oblong area or another shape. The space be positioned a pre-determined distance from a border of the video frame.

The space may be created for each video frame included in a segment of a video file. A different size space may be created for two or more video frames of a video file. A different size space may be created for two or more segment of a video file. Each segment may be defined based on a time window. The time window may be defined relative to a start time (to) of the video file. The time window may be defined relative to an end time of a prior segment. The time window may be defined relative to a start time of a subsequent segment.

Based on the frame rate of a video file, the time window may include numerous video frames. A space may be created in each video frame that is included in the segment. The space may have any suitable shape. The space may have any suitable area. The space may correspond to a size of a MRL generated based on user entered design choices. The space may be larger or smaller than a size of the MRL.

Methods may include inserting the MRL into the one or more spaces created in a video file. Methods may include inserting at least part of the MRL into the space. Methods may include inserting the MRL into the space created within each video frame included in a segment of a video file. The number of video frames included in the segment may depend on the video frame rate of the video file. In some embodiments, the segment may be defined based on a specifying a number of video frames after a start time. The start time may be a beginning of a video file (to) or any suitable time during playback of the video file.

Methods may include assigning different design choices to one or more spaces into a video file. For example, a first sequence of video frames may include a first size MRL. The first sequence of video frames may include a first image or first background color. A second sequence of video frames may include a second size MRL. The second sequence of video frames may include a second image or a second background color.

Methods may include rendering a resultant video file. The resultant video file may be any suitable length. The resultant video file may include the resized segment of the video file and the space created by resizing the segment. The resultant video may include the MRL embedded into the space. The MRL may be embedded into the space of each video frame in the segment. The MRL may be embedded into a different part of the space for each video frame included in the segment.

The resultant video file may maintain a video quality level associated with pre-existing content included in the video frames. For example, an uploaded video file may include video frames rendered for distribution to television viewers on a 1080p screen or target screen size. The resultant video file, including the MRL and any other content embedded into the video frames, may also be rendered for distribution to television viewers on a 1080p screen or the target screen size.

In some embodiments, different design choices may be applied to the MRL embedded in different video frames included in the segment. For example, different size MRLs may be embedded into different video frames included in the segment. Different color MRLs may be embedded into different video frames included in the segment. MRLs having the same aesthetic appearance may have different information encoded in the data zones of each MRL. Each video frame in the segment may have different information encoded in the MRL embedded in that video frame.

In some embodiments, the resultant video file and associated design choices applied to an MRL may be rendered in real-time, as the user enters the design choices. In some embodiments, the resultant video file may be rendered in response to a user command. For example, a user may only render a resultant video file after the user has entered a plurality of design choices for an MRL.

Methods may include applying computational aesthetic techniques to define an aesthetic appearance associated with the user's design choices. An aesthetic appearance may be defined for an MRL based on user input design choices. Computational aesthetic techniques may include generating mathematical representations of the user input design choices. Computational aesthetic techniques may include applying algorithms and statistical models to generate a numerical aesthetic assessment of user input design choices. Such algorithms and statistical models may be specially formulated to adhere to known requirements and standards for QR codes. Illustrative QR code standards may include ISO/IEC 18004:2015 and ISO/IEC 24778:2008.

Computational aesthetic techniques may include applying machine learning algorithms to define the aesthetic appearance of an MRL, video frame or video segment. The machine learning algorithms may be applied to generate design choices for one or more zones of an MRL. The machine learning algorithms may be applied to alter user input design choices for one or more zones or modules of an MRL. Based on the user entered design choices, machine learning algorithms may define how the design choices impact human aesthetic judgment and identify regions (e.g., based on modules) of the MRL that may be relatively more or less important for human aesthetic judgment.

Illustrative computational techniques that may be used to define aesthetic appearance may include application of machine learning techniques, such as AdaBoost, Naive Bayes, Support Vector Machine, Random Forests, Artificial Neural Networks and Convolutional Neural Networks. Computational techniques may include applying image clustering unsupervised machine learning to define aesthetic appearance. Illustrative image clustering may include applying K-Means Clustering and Fuzzy Clustering.

User input design choices for an MRL may define a target position for the MRL within a video frame. A target position for an MRL within a video frame may be defined relative to an outer border of pre-existing content included in the video frame. A target position for an MRL within a video frame may be defined relative to an outer border of resized pre-existing content included in the video frame. A target position for an MRL within a video frame may be defined relative to an outer border of the video frame.

Methods may include conducting automated testing of an MRL. Automated testing may occur after generating an MRL based on user input design choices. Automated testing may occur before embedding an MRL into a video frame. Automated testing may occur after embedding an MRL into a video frame.

Automated testing may determine whether an MRL achieves a threshold level of scan reliability. Scan reliability may be defined as extracting information encoded in a data zone of an MRL within a threshold time (e.g., ≤100 milliseconds) by a threshold number of scanning devices (e.g., Android and iOS devices). The automated testing may determine whether the MRL achieves a threshold level of scan-ability after the MRL is embedded into a video frame. Automated testing may determine whether the MRL achieves a threshold level of scan-ability when during playback of a video file and the MRL is displayed electronically on a screen.

The MRL may include error correction code. The error correction code may be included in a data zone of the MRL. Illustrative error correction code may utilize Reed-Solomon codes to encode redundant information. The error correction code may be applied to restore data encoded by modules when a portion of a MRL is missing or damaged. A MRL may include various levels of error correction.

A data zone of a MRL may include error correction code. Error correction code may utilize modules with the data zone to store redundant copies of information to compensate for damaged modules in the data zone that cannot be read by a scanning device. An exemplary target error correction level may allow restoration of at least 15% of data bytes encoded in a data zone. Other illustrative target error correction levels may include:

Level L—7% of data bytes can be restored.
Level M—15% of data bytes can be restored.
Level Q—25% of data bytes can be restored.
Level H—30% of data bytes can be restored.

A MRL that includes a 30% error correction level will be scannable even if 30% of the modules are damaged (soiled, washed out, faded, replaced with images). Generally, the higher level of error correction included in the MRL, the less instructions can be stored within a data zone of the MRL. Typically, the higher the error correction level the more modules are needed within the data zone. Therefore, higher error correction levels are associated with denser (e.g., more modules per unit area) data zones. MRLs with higher levels of error correction and denser data zones may not as reliably scannable when presented in digital media compared to MRLs printed on tangible surfaces.

Digital media may include content that uses an electronic device for its creation, distribution, viewing or storage. Examples of digital media include software, images, videos, video games, television shows, webpages, social media posts, digital data, audio, live sport and entertainment events, video conferencing and other electronic information.

Generally, MRLs are not as reliably scannable when presented in digital media compared to MRLs printed on tangible surfaces. Firstly, electronically displayed information is not static. Electronically displayed information must be "refreshed" to maintain visibility on a screen. A screen's refresh rate (measured in Hertz or "Hz") is the maximum times per second the screen is able to present a new video frame or redraw the same video frame. The time between each video frame refresh is typically measured in milliseconds. For example, a screen having a 60 Hz refresh rate is capable for presenting 60 fps. Even if a video file has been recorded at 90 fps, a screen with a refresh rate of 60 Hz will only display 60 fps.

Similarly, a camera of a scanning device may only be capable of capturing information at a defined number of frames per second. A mismatch or discordance between the refresh rate of the screen and the capture rate of the scanning device may result in MRLs that are not scan-able by a scanning device and are therefore not reliably scannable. For example, a scanning device may attempt to capture a displayed MRL between each refresh cycle of the screen displaying the MRL. The scanning device may therefore only capture an image of the MRL presented on the screen at a time the image of the MRL is fading or has faded entirely (before being subsequently refreshed).

Resolution on an electronic screen is measured in pixels per inch ("PPI"). Resolution refers to how many pixels a screen can display. A pixel is the smallest unit of an electronic graphic or an image, which can be represented or displayed on a screen. The more pixels that are displayed per inch, the higher the resolution, sharpness and detail of the electronically displayed content.

Resolution of a screen is typically measured by the width and height of the number of pixels displayed by a screen. For example, common screen resolutions are 1280×720 ("720p" or "High Definition" format), 1920×1080 ("1080p" or "Full High Definition" format), 2560×1440 ("1440p" or "Quad High Definition" format), and 3840×2160 ("2160/4K" or "Ultra High Definition" format). Notably, each of these resolutions is associated with an aspect ratio of 16:9.

Typically, when printing on a tangible medium, resolution is measured in dots per inch ("DPI"). The more dots (of ink) that are printed per inch, the higher the resolution, sharpness and detail of the printed material. Ink dots are typically round, and electronic pixels are typically square. Therefore, information such as an MRL displayed electronically may not be as reliably scan-able as a printed version of the same MRL. Other variable display attributes of electronic screens that may impact scan-ability of a MRL include brightness, contrast, gamma and color settings. Some screens may also apply filters that alter displayed content and impact MRL scan-ability. Illustrative filters may include sharpness, blue light and motion-blur reduction filters.

Automated testing may determine a level of scan-ability for a MRL when presented electronically on a screen. Automated testing may determine a level of scan-ability for a MRL when presented on a screens having different sizes and different display attributes. Automated testing may simulate scanning of a MRL displayed on a screen at a target distance away from the screen. Automated testing may determine whether an MRL generated based on user input design choices does not, or is likely to not, achieve a threshold level of scan-ability.

Automated testing of an MRL may include playing a video frame includes an embedded MRL. The video frame may be included in a resultant video file. The testing may include automatically detecting the MRL when displayed by one or more video frames. The automated testing of the MRL may include simulating extracting of data encoded in the MRL from a target distance when the one or more video frames are displayed electronically on a target screen size. The testing may include determining a height and width of a data zone of the MRL detected within the video frames. The testing may include calculating whether the MRL included in the video frames is scannable at a threshold distance from a screen that presents the video frames.

Methods may include automatically adjusting design choices of an MRL to improve scan-ability of the MRL. Methods may include improving scan-ability of the MRL for a screen having target display attributes. For example, methods may include applying machine learning algorithms to generate an MRL that includes an aesthetic appearance defined by user input design choices and achieves a threshold level of scan-ability when displayed on a screen having a 2560×1440 resolution and a 60 Hz refresh rate and scanned by a viewer positioned 6-8 feet away from the screen.

Methods may include adjusting a height and width of the MRL. Methods may include adjusting the height and width of the data zone. Methods may include adjusting the height and width of the position detection patterns. Methods may include adjusting the height and width such that the MRL is scannable at a threshold distance when displayed on a screen having a target set of display attributes.

Methods may include detecting that a generated MRL does not achieve the threshold level of scan-ability for a target screen size. Methods may include generating a replacement MRL that achieves the threshold level of scan-ability for the target screen size. Methods may include detecting that the MRL does not achieve a threshold level of scan-ability when embedded in one or more video frames. Methods may include generating a replacement MRL. The replacement MRL may be generated by automatically adjusting one or more display properties of pre-existing content included in the video frames such that that replacement MRL, after being embedded in the video frames, achieves the threshold level of scan-ability.

For example, design choices selected by a user may cause an MRL to "blend into" pre-existing content included in one or more video frames. After being embedded the video frames, the MRL may not be sufficiently distinguishable from pre-existing content included in the video frames, causing the MRL to be poorly scan-able or achieve less than a threshold level of scan-ability during automated testing.

To improve scan-ability of the MRL, methods may include adjusting one or more display properties of pre-existing content in the video frames such that the MRL is more distinguishable when displayed alongside the content. For example, methods may include changing one or more display properties of pre-existing content included in one or more video frames. Such changes may include changes to brightness, contrast, and color balance associated with the pre-existing content.

Methods may include receiving a set of design choices from a user. Illustrative design choices for an MRL may include dimensions of a data zone of the MRL, contrast between colors applied to modules in the data zone, brightness of the colors included in the data zone, dimensions of a buffer area between the data zone and an environmental zone and location of position detection patterns.

After receiving a first user entered design choice, methods may include detecting that selection of a second design choice by the user will prevent the MRL, when embedded into a video frame, from achieving a threshold level of scan-ability. Methods may include disabling selection of the second design choice before the user has an opportunity to select the second design choice. Had the user been allowed to select the second design choice, the MRL generated based on the set of user entered design choices would not have achieved a threshold level of scan-ability.

Methods may include determining one or more visual properties associated with pre-existing content included in video frames. Based on the determined visual properties, methods may include automatically adjusting the user entered design choices for an MRL such that the MRL, when embedded in the video frames, achieves a threshold level of scan-ability.

Automatic adjustments to design choices may include maximizing a size and density of modules within a data zone. The size and density of modules in the data zone may be adjusted based on dimensions of the space created for the MRL within a video frame. Automatic adjustments to the MRL may include maximizing a size of a data zone of the MRL based on dimensions of a screen that will display a resultant video file that includes the MRL.

Methods may include adjusting content presented on a scanning device in response to a capturing a scan of an MRL. Methods may include dynamically determining content to display based on one or more scan event details captured at a time the MRL is scanned. Scan event details may include a media channel that carries a resultant video file. A media channel may be associated with a target frame rate or other video display attribute. Scan event details may include a desired audience (e.g., demographic group, geo-location based) that is expected to view the resultant video file.

Methods may include automatically generating an overlay. The overlay may be configured to fit into a space created in a video frame. The overlay may define the space. The space may define the overlay. The overlay may be positioned on top of pre-existing content included in a video frame. The overlay may be generated based on the user entered design choices for an MRL. The overlay may be generated based on and one or more visual properties of pre-existing content included in a video frame or segment of a video file. The overlay may be generated based on a computationally determined aesthetic appearance associated with the user entered design choices. The overlay may be generated based on a computationally determined aesthetic appearance associated with pre-existing content in one or more video frames.

Methods may include generating a first plurality of overlay sections. The user may provide instructions for altering a color, image, sound or any other suitable design choice for a target overlay section. Methods may include generating multiple resultant video files that each include differ with respect to the user define alteration in design choice.

For example, methods may include generating a first plurality of MRLs. Each MRL in the first plurality may include a set of design choices. Methods may include generating a second plurality of resultant video files. Each resultant video file in the second plurality may include a corresponding one of the MRLs in the first plurality. Each of the first plurality of MRLs may include the first set of design choices and include different information encoded in each data zone. For example, each of the first plurality of MRLs may include a unique identifier encoded in each data zone.

An MRL may include two or more unique identifiers encoded in its data zone. Each unique identifier may correspond to a different attribute of the MRL. For example, a first identifier may correspond to a template used to create a resultant video file that includes the MRL. A second identifier may correspond to an MRL type (e.g., custom designed MRL vs. stock MRL). A third unique identifier may correspond to a platform that distributed the resultant video file that includes the MRL.

To the human eye, each of the MRLs in the first plurality may appear visually indistinguishable. The difference in modules due to differences in each unique identifier may not be distinguishable to the human eye. However, a scanning device may detect the different unique identifiers.

The unique identifiers may allow for tracking scans associated with resultant video files that are distributed to different viewers or groups of viewers. The unique identifiers may allow tracking of scans of a MRL included resultant video file distributed to different geographic regions, demographic groups or by different media stations. Illustrative geographic regions may include zip codes, or viewers within a target distance of a target location or landmark.

For example, a first resultant video file distributed to a first geographical region may include a first overlay that includes an MRL having a first unique code. A second resultant video file distributed to a second geographical region may include a second overlay that looks identical to the first overlay distributed to the first geographic region except for inclusion of an MRL in the second overlay having a second unique identifier that is different from the first unique identifier. Two overlays that are indistinguishable except for different unique identifiers encoded in the MRLs of each overlay may allow a media channel to distinguish between scans received from the first and second geographic regions. The different unique identifiers in each MRL may be leveraged to generate performance metrics (e.g., impressions, cost-per-scan, conversion ratio) for a target viewer population.

Each of the resultant video files distributed to the first and second geographic regions may be indistinguishable to a viewer. Differences in module patterns of the data zones of each MRL due to encoding different unique identifiers may not be discernible to a human viewer. However, a scanning device may detect the unique identifier and capture the unique identifier as a scan event detail. In some embodiments, a unique identifier encoded in an MRL may identify the overlay template included in the resultant video file. Identifying the particular overlay template may generate performance metrics on viewer scan rate for the particular overlay template.

Methods may include generating MRLs that each include a unique identifier that may be used to track individual households, individual viewers or target screen sizes will receive or display a resultant video file. Generating a unique identifier for each household, viewer or screen size may generate performance metrics that distinguish between MRL scan activity of the different households, viewers or screen sizes.

A system for dynamically embedding a machine-readable label ("MRL") in a video file is provided. The system may include machine-readable instructions stored on a non-transitory memory. The machine-readable instructions may be executed by one or more processors of a computer system. The machine-readable instructions, when executed by the one or more processors, may cause the computer system to implement functionality described by the machine-readable instructions.

The processor may control overall operation of the computer system and its associated components. The processor processes data and may include one or more processors. Illustrative processors may include microprocessors such as a central processing unit (CPU), microcontrollers, or the like. The term processor may encompass all apparatus, devices, and machines for processing data, including by way of example a programmable processor, a computer, or multiple processors or computers.

Generally, machine-readable instructions may include routines, programs, objects, components, data structures, etc. that perform particular tasks or implement particular data types or structures. For example, machine-readable instructions may be a software application stored within non-transitory memory and/or other storage medium of a computer system. The non-transitory memory of the computer system may also store other software applications such as an operating system, application programs, and an associated database.

Some or all of the machine-readable instructions may be embodied in hardware or firmware. The hardware and firmware may include one or more circuit boards. In some embodiments, the circuit boards may be integrated into a single chip. The chip may be silicon-based.

The computer system may support establishing network connections to one or more remote computers or networks. Illustrative network connections may include a local area network ("LAN"), a wide area network ("WAN") and may also include other networks. When used in a LAN networking environment, the computer system may connect to other systems on the LAN through a network interface or adapter. The computer system may support establishing communications over a WAN, such as the Internet. The existence of any of various well-known protocols such as TCP/IP, Ethernet, FTP, HTTP and the like is presumed, and the computer system may operate in a client-server configuration to permit retrieval of web pages from a web-based server. Web browsers (e.g., on a viewer or owner device) can be used to display and manipulate data on web pages.

Cloud computing and virtualization implementations of a computer system may be designed to run on a physical apparatus supplied externally by a hosting provider, a client, or other virtualized platform. The computer system may be operational with distributed computing environments where tasks are performed by remote processing devices that are linked through a communications network. In a distributed computing environment, program modules of the computer system may be located in both local and remote computer storage media including memory storage devices. The computer system may rely on a network of remote servers hosted on the internet to store, manage, and process data (e.g., "cloud computing" and/or "fog computing").

The computer system may include machine-readable instructions for invoking user functionality related to communication, such as email, short message service ("SMS"), and voice input and speech recognition applications. The computer system may utilize one or more algorithms or other software applications that generate MRLs based on design choices entered by a user or any other suitable tasks.

The computer system may include a MRL generator. An illustrative MRL generator is described in U.S. Pat. No. 11,010,650, entitled "Machine-Readable Label Generator" and issued on May 18, 2021, which is hereby incorporated by reference herein in its entirety. The MRL generator may allow a user to customize the appearance of an MRL and content presented to a viewer that scans the MRL. The MRL generator may be programmed such that a custom library of design choices (e.g., images, colors and shapes), custom content options and restrictions are available to a user that uses the MRL generator to create an MRL. The MRL generator may be accessed by an application program interface.

The MRL generator may generate an MRL optimized for scan recognition when the generated MRL is displayed electronically, such as on a screen. The optimized copy of the generated MRL may encode a default scan destination. The default scan destination of the MRL may be linked to custom content. When the MRL is scanned, the linked custom content will be presented to a scanning viewer. Apparatus and methods for linking a MRL to custom content are described in U.S. Pat. No. 11,120,095, titled "Refactoring of Static Machine-Readable Codes" and issued on Sep. 14, 2021, which is hereby incorporated by reference herein in its entirety.

The computer system may capture and process data in different structures or communication formats. For example, the computer system may use different data structures to store captured data. The computer system may utilize different communication protocols to transmit captured data or communicate with other computer systems. Despite such operational differences, the computer system may be configured to operate substantially seamlessly with those other computer systems. Interoperability may allow a user to generate an MRL using a first computer system, integrate the MRL into a video using a second computer system, capture viewer scans of the MRL captured during playback of the video using a third computer system and utilize a fourth computer system to process and analyze the captured viewer scans.

The computer system may include a user interface ("UI"). The UI may provide access to software tools for a user to integrate an MRL into one or more frames of a video file. The UI may present performance metrics associated with a MRL to a user. The UI may be utilized to present custom content to a viewer that scans the MRL presented in the video file. The UI may format the custom content based on a configuration setting, hardware or software associated with a scanning device of the viewer.

The computer system may include machine-readable instructions that cause one or more processors to receive a user selection of a time window within a video file. The instructions may cause the processors to generate a machine-readable label ("MRL"). The MRL may be generated based on a set of user entered design choices.

In some embodiments, the instructions may cause the processors to resize pre-existing content in the video file displayed during the time window. The resizing may create a space between at least one edge of a video frame and the pre-existing content included in the video frame. The video frame may include a width and a length. The space may extend along a width of the video frame. The space may extend along a height of the video frame. The space may extend along a width and height of the video frame.

Each video frame displayed within the time window may be resized to create different size spaces for each video frames. For example, the size of the space may progressively increase as playback of the video file proceeds from video frames at a start of the time window to video frames at an end of the time window. Creating larger spaces for MRL inserted into video frames closer to the end of the time window may allow for larger size MRLs to be embedded into those frames. Thus, the MRL displayed to viewers during the time window may progressively increase in size during playback of video file.

The machine-readable instructions may cause the processors to embed at least part of the MRL within the space. The MRL may extend beyond the space. The MRL may overlap with pre-existing content included in a video frame. The machine-readable instructions may cause the processors to render a resultant video file. The resultant video file may include at least one video frame that includes an embedded MRL. The MRL may be embedded in the space. The MRL may be overlaid on top of pre-existing content included in the video frame.

The machine-readable instructions may cause the processors to determine a scan-ability level of an MRL generated based on user entered design choices. When the MRL does not achieve a threshold scan-ability level, the machine-readable instructions may cause the processors to generate a replacement MRL. The replacement MRL may be generated such that it achieves the threshold scan-ability level.

A set of design choices provided by a user may be a first set of design choices. The machine-readable instructions may cause the processors to generate an overlay. The overlay may be generated based on a second set of design choices. The second set of design choices may also be input by the user. The second set of design choices may be machine generated. The second set of design choices may be automatically generated based on the first set of design choices. The second set of design choices may be based on color, text or shapes extracted from an image or logo.

The system may generate a plurality of overlays. For example, different overlays may be generated for different video frames displayed during the time window. The colors, size or images included in an overlay may change from frame to frame within the time window. For example, a first set of colors may be included in the overlay for a first set of video frames. A second set of colors may be included in the overlay for a second set of video frames.

The machine-readable instructions may cause the processors to generate a virtual video frame. The virtual frame may simulate creation of a space between at least one edge of a video frame and an area of the frame that will display resized pre-existing content. The machine-readable instructions may cause the processors to generate an overlay. The overlay may fit into the space. The overlay may be positioned in the video frame on top of below pre-existing content included in the video frame. The overlay may be generated based on a second set of user entered design choices. The overlay may include images, text, sound and color. The overlay may have the same dimensions as the space.

A virtual frame may simulate the overlay. In the virtual frame, the overlay may be "overlayed" above the space. In the virtual frame, the overlay may be "overlayed" above pre-existing content included in the video frame. The overlay may include an MRL. The MRL may be positioned at least partially, within the space. At least part of the MRL may extend outside the space. The virtual frame may include resized pre-existing content. The virtual frame may show a simulation of at least one video frame of a resultant video file as would be displayed during playback of the resultant video file.

The machine-readable instructions may cause the one or more processors to generate computer code that animates the MRL embedded in a resultant video file. Animating the MRL may cause the MRL to be presented in different locations within two or more video frames of a resultant video file. The machine-readable instructions may cause the animated MRL to be presented in different sizes within two or more video frames of the resultant video file.

The machine-readable instructions may alter user entered design choices for one or more zones of the MRL before embedding the MRL within video frames of the resultant video file. For example, an exemplary time window may include one hundred video frames of a video file. In a resultant video file, the first twenty-five video frames may show modules of a data zone in a first color and modules of an environmental zone having a first shape. The second twenty-five video frames may show modules of the data zone having a second color. The third twenty-five video frames may show modules of the data zone having the second color and modules of the environmental zone having a second shape. The fourth twenty-five frames may include a change to color or shape of an outer border encircling the environmental zone.

The virtual frame may simulate playback of video frames displayed in the resultant video file during the time window. In some embodiments, the virtual frame may be generated and presented to a user before rendering the resultant video file. In some embodiments, the virtual frame may be generated and presented to a user based on rendering a resultant video file. The rendering may occur in real-time in response to each user supplied design choice. The virtual frame may simulate any animation associated with the MRL and show the MRL as it would be displayed during playback of the resultant video file. The virtual frame may simulate display of the overlay, as it would be displayed during playback of the resultant video file. The virtual frame may simulate display of pre-existing content included in a video frame alongside the animated MRL or overlay.

The machine-readable instructions may cause the one or more processors to determine a buffer zone. For a video frame displayed during the time window, a buffer zone may include an area of a video frame. The area of the video frame may be outside a space created by resizing the pre-existing content of that video frame. The area of the video frame may include pre-existing content included in a video frame. The machine-readable instructions may cause processors to determine whether pre-existing content of the video frame displayed within the buffer zone is background or foreground content.

When the pre-existing content displayed within the buffer zone is background content, the machine-readable instructions may allow the overlay and associated MRL to occupy the buffer zone and obscure the background content included in the video frame. When the pre-existing content displayed in the buffer zone is determined to be foreground content, the machine-readable instructions may resize the pre-existing content to create a space within the video frame. The machine-readable instructions may position the MRL entirely within the space.

In some embodiments, when pre-existing content included in a buffer zone is determined to be foreground content, the machine-readable instructions may suggest alternative overlay templates that do not obscure the foreground content. In some embodiments, when pre-existing content included in a buffer zone is determined to be foreground content, the machine-readable instructions may alter dimensions of a user selected overlay template and/or resize the pre-existing content included in each video frame.

A computer system for dynamically embedding a machine-readable label ("MRL") in a video file is provided. The computer system may include one or more processors that execute machine-readable instructions. The machine-readable instructions, when executed by the one or more processors, cause the computer system to receive a user selection of a time window within the video file. The instructions may cause the processors to generate a plurality of machine-readable labels ("MRLs"). Each of the plurality of MRLs may be generated based on a set of user entered design choices. Each of the plurality of MRLs may be generated based on one set of user entered design choices. Each of the MRLs may include a machine-generated unique identifier. The unique identifier may be encoded in a data zone of the MRL.

For example, the data zone of an MRL may encode the following information: www.Default_Scan_Destination.com/123/456. The segment "www.Default_Scan_Destination.com" may correspond to a default URL. The segment "/123" may be a first unique identifier. The segment "/456" may be a second unique identifier. When a viewer scans the MRL, the scanning device may extract the information encoded in the data zone and direct the scanning device to the default URL. The scanning device may also extract the unique identifier along with the default URL. Each of a plurality of MRLs may encode the default URL and a unique identifier (e.g., 124, 125, 126).

The scanning device transfer the unique identifier to a computer server hosting the default URL. The computer server may be programmed to look for the unique identifier appended to the default URL. Based on the unique identifier, the computer server may formulate and respond to the scanning device with a custom content or redirect the scanning device to a different URL or other scan destination. The custom scan destination may be determined based on the unique identifier encoded in data zone of the scanned MRL.

For example, scanning a MRL that includes the unique identifier "123" may be directed to a first website. Scanning a MRL that includes the unique identifier "124" may be directed to a second website. Such a scheme may enable conduct of A/B testing of different scan destinations and enable generation of comparative analytics for different scan destinations. Custom content may be dynamically adjusted based on captured scan event details or viewer activity after being redirected to a custom scan destination.

Machine learning algorithms may be deployed to determine custom content that will be provided to a scanning viewer. Illustrative machine learning algorithms that may be utilized include AdaBoost, Naive Bayes, Support Vector Machine, Random Forests, Artificial Neural Networks, Deep Neural Networks and Convolutional Neural Networks.

Custom content provided in response to a scan may be determined based on one or more scan event details captured when a viewer scans an MRL. Illustrative scan event details may include a scan time, geographic location of a scanned MRL, scanning device, identity of viewer, identity of scanning device, software (e.g., applications or operating system) running on the scanning device, manufacturer of the scanning device, media channel that distributes the resultant video file, weather at time of scan or other information that may be correlated to a MRL scan.

Scan event details may be captured by a cookie resident on a browser of a scanning device. Scan event details may be captured by a tracking pixel resident on a webpage visited by a viewer or scanning device. Scan event details captured by a cookie or tracking pixel may be stored on the scanning device.

The machine-readable instructions may auto-generate custom content based on captured scan event details or a Consumer Intent Graph ("CIG") associated with the scanning device or a viewer. A CIG may refer to graphical connections linking offline activity to online activity of a viewer. A CIG may link offline activity associated with a MRL (e.g., information encoded in the data zone) to online activity associated with multiple viewers (e.g., each having scanned the same MRL).

The CIG may link trackable electronic activity of a viewer in response to scanning an MRL. The CIG may link scan event details to online activity of the viewer after scanning an MRL. For example, the CIG may link a geographical location of a screen that displayed a scanned MRL to actions taken by multiple viewers after they each scan the MRL. The CIG may index, or rank actions taken by viewers after scanning an MRL. The CIG may include relationships that represent a degree of relevancy for potential content that may be presented to a viewer in response to scanning an MRL.

Scanning an MRL may submit the default scan destination encoded in the scanned label to a redirect service. The redirect service may be a cloud-based application hosted on a remote computer server. The redirect service may formulate content, or trigger an action associated with the default scan destination of an MRL. An exemplary system may utilize a CIG and scan event details indexed therein to determine custom content to present to a viewer in response scanning an MRL.

The redirect service may adjust a post scan experience or landing page associated with an MRL that has already been embedded in a resultant video file. The redirect service may adjust a post scan experience or landing page associated with an MRL in the resultant video file without changing module of the MRL.

Based on information encoded in a scanned MRL, associated scan event details and information stored in a CIG, the redirect service may compute a content index score for custom content options associated with a scanned MRL. The custom content options may be content that is being A/B tested. The intent index score may be a probabilistic score that predicts whether a viewer is likely to take a specific action or utilize one or more of the custom content options in response to scanning the MRL.

For example, the intent index score for a custom content option may have a range of 0 (unlikely viewer will take action when presented with content) to 100 (viewer likely to take action when presented with content). Based on the content index score for potential content, the system may present a custom content option having the highest intent index score to a scanning viewer. The system may present the highest scoring content by redirecting a browser on the scanning device to a URL of a webpage that presents the highest scoring custom content option.

U.S. Pat. No. 11,120,095, titled "Refactoring of Static Machine-Readable Codes" and issued on Sep. 14, 2021, and incorporated by reference herein describes apparatus and methods for an illustrative redirect service, dynamically generating custom content or redirecting a scanning device to custom content, in response to a scanning an MRL.

Machine-readable instructions may cause one or more processors of the computer system to resize pre-existing content displayed within one or more video frames presented during the time window. The instructions may cause the processors to create a space between an outer border of each of the video frames presented during the time window and pre-existing content included within the outer border of each video frame.

For each of the plurality of MRLs, the instructions may cause the processors to render a corresponding resultant video file. Each resultant video file may include at least one of the plurality of MRLs positioned within the outer border of each video frame displayed during the time window. The instructions may cause the processors to render the corresponding resultant video file in real-time as the user enters design choices for the MRL or other sections of an overlay.

The machine-readable instructions may cause the processors to render a resultant video file in accordance with one or more format requirements of a target media distribution channel. The machine-readable instructions may cause the processors to render a resultant video file in accordance with one or more format requirements for any suitable digital video, distribution partner, and video distribution platform such as linear television, connected television ("CTV"), electronic billboards or over-the-top ("OTT") content delivery platforms.

The machine-readable instructions may cause the processors to render a resultant video file in accordance with a screen size or other display setting of a target device that will receive and playback the resultant video file. For example, a resultant video file may be rendered based on size, resolution or color settings of a screen or other device expected to display the resultant video file.

The machine-readable instructions may cause the processors to automatically adjust a size of at least one of the plurality of MRLs based on a size or other display property of a screen expected to present the resultant video file. For example, the machine-readable instructions may cause the processors to automatically adjust a density (e.g., number of modules per unit area) of a data zone based on size of a screen expected to present the resultant video file.

Different size screens may be viewed from different distances. For example, a video file expected to be displayed during over a television distribution channel may be viewed on a 1080p screen from ten feet away. On the other hand, the same 1080p screen may be part of a viewer's desktop computer system may be viewed from only 1-2 feet away.

The computer system may include machine-readable instructions that automatically accounts for an expected viewing distance when generating a MRL or rendering a resultant video file that includes the MRL. For a given size screen, the system may compute the number of pixels per inch ("effective" pixels) utilized by a screen. The machine-readable instructions may normalize video frames for display on different screens or from different viewing distances by adjusting the number of pixels per inch to optimize a resultant video file for perceived size (rather than physical size).

For example, rendering the resultant video file may include generating a first MRL that is reliably scannable when presented on a 65-inch television screen viewed from ten feet away and generating a second MRL that is reliably scannable when displayed on a 6-inch screen of a mobile device which is typically viewed a 1-2 feet away. Scan reliability may be defined by a data zone that can be read within a threshold time (e.g., ≤100 milliseconds) by a target scanning device or threshold number of scanning devices.

In some embodiments, after taking account of an expected viewing distance a single resultant video file may be utilized for different screens. For example, a resultant video file rendered for distribution to television viewers and displayed on a 1080p screen typically positioned ten feet away from a viewer may also be used for display on a 540p screen of a mobile device which is typically positioned closer to the viewer.

Apparatus may include an autonomous MRL scanning software tool that automatically monitors media channels (e.g., linear television distribution channels) and detects whether an MRL is presented within video frames displayed on the monitored media channel. The software tool may capture metadata about a detected MRL and the video frame that included the MRL. The captured metadata may provide insight into viewer interaction with an MRL embedded in a video frame. The captured metadata may provide insight into how to improve presentation of MRLs within a video frame. Such improvements may include higher conversion rates for video-based advertisements that include an embedded MRL. The captured metadata may also be used to generate performance metrics that define benchmarks for measuring viewer interaction with an MRL embedded in a video frame.

Illustrative metadata captured by the autonomous MRL scanning software tool may include an identifier of a media channel, time a detected MRL was distributed on a media channel, amount of time the detected MRL was displayed, location on screen where the detected MRL was displayed, video file or frame that included the detected MRL, other pre-existing content in the video file or frame that includes the detected MRL, size (e.g., width and length) of the detected MRL, call to action (e.g., sound, text or image) presented alongside the detected MRL, animation associated with the detected MRL, post scan experience or landing page associated with the detected MRL, number of impressions of the detected MRL, audience type (e.g., age, demographic, geographic) targeted by the detected MRL, estimated cost of advertising space on the media channel that includes the detected MRL. Illustrative outputs generated by the autonomous MRL scanning software tool may include number of scans of the detected MRL, number of views of content presented in response to a scan of the detected MRL and conversions (e.g., sale of an advertised product or service) after scanning a detected MRL.

The autonomous MRL scanning software tool may scan multiple media channels. The autonomous MRL scanning software tool may scan multiple media channels simultaneously. The autonomous MRL scanning software tool may programmatically inject code into a web page and capture video frames presented within the medio channel. Captured video frames may be converted into an HTML canvas. A data URL may be generated based on the HTML canvas.

To detect an MRL, the autonomous MRL scanning software tool may inject the following illustrative code into a webpage that displays content presented by monitored media channel. For example, the webpage may stream content carried by a target media channel. The code injected into the webpage may include the following illustrative library of computer code that scans QR codes: https://github.com/nimiq/qr-scanner.

To detect whether a video frame includes an MRL, the data URL generated based on the HTML canvas is passed to the scanning library. The scanning library then scans each captured video frame and determines whether the video frame includes an MRL. A variable may be incremented if multiple video frames are detected that each include an MRL that encodes identical information.

After detecting an MRL in one or more video frames, the autonomous MRL scanning software tool may store a first data object. The first data object may include the URL associated with video frames that included the detected MRL, the time the MRL was detected in the video frames, the current time, and a number of video frames before and after the time the MRL was detected.

Based on the number of video frames saved, the autonomous MRL scanning software tool may generate a second data object. The second data object may include analytics associated with the saved video frames in the first data object. Illustrative analytics that may be associated with the saved video frames may include cost and impression data such as:

The total number of impression of the saved video frames for a specified duration (e.g., at least 3 seconds);

The total number of impressions with a defines time limit (e.g., from a time the saved video frames where first distributed until three days after the first distribution);

Impressions of the saved video frames via digital video recorder or video on demand;

Cost per specified number of impressions of the saved video frames;

Ratio of total number of impressions of the saved video frames relative to specified viewing population; and/or Percentage of impressions of the saved video frames for specific demographic group (e.g., females, males, viewers aged 18-24).

The autonomous MRL scanning software tool may measure a total duration of time a detected MRL has been displayed to viewers. The tool may register a timestamp for each video frame that includes a detected MRL. The tool may associate video frames with a single URL (e.g., the first data object described above) after a detecting that a threshold number of video frames have been displayed that do not include any MRLs. An average value of each timestamp associated with each video frame included the first data object may represent how much time the detected MRL was displayed to viewers.

The autonomous MRL scanning software tool may also determine a display position on a detected MRL on an electronic screen. For example, if a detected MRL is a QR code having a square or rectangular data zone, the tool may detect a length and width of each side of the detected QR code. The tool may also calculate a center point of a detected QR code by averaging the x-coordinates to determine a center x-coordinate and averaging the y-coordinates to determine a center y-coordinate. The center x-coordinate and center y-coordinate may correspond to the center of a detected QR code. Based on the center of a detected QR code and size of the electronic screen that displays the detected QR code, a position of the detected QR code on the screen may be determined.

Based on the determined width/height of a detected MRL, the tool may determine a percentage area that the detected MRL occupies on an electronic screen. Based on the percentage area, the tool may determine a maximum distance a viewer may be positioned away from the screen and reliably be able to scan the detected MRL. The tool may also provide a calculator function that accepts as input, an uploaded video frame or still image that includes an MRL. The tool may output a maximum distance a viewer can reliably scan the uploaded MRL. An illustrative equation for determining a maximum scan distance may be: Max Scan Distance=$11.8*x \pm \sigma$.

The character "x" may represent length or width of one side of a data zone of an MRL. The character "$\sigma$" may represent a standard deviation or other value that accounts for differences in MRL scan-ability due to environmental conditions. Illustrative environmental conditions may include a scanning device type used to scan an MRL. Illustrative examples of device type may include operating system of the scanning device (e.g., android, iOS), manufacturer (e.g., Apple, Samsung) or capabilities of a camera (e.g., number of mega pixels). Environmental conditions may include lighting, an angle of the MRL with respect to the scanning device and sharpness of the MRL image.

Apparatus and methods in accordance with this disclosure will now be described in connection with the figures, which form a part hereof. The figures show illustrative features of apparatus and methods in accordance with the principles of this disclosure. It is understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method and/or apparatus described herein.

Apparatus embodiments may omit features shown and/or described in connection with illustrative apparatus. Apparatus embodiments may include features that are neither shown nor described in connection with illustrative apparatus. Features of illustrative apparatus embodiments may be combined. For example, an illustrative apparatus embodiment may include features shown or described in connection with any other illustrative apparatus and/or method embodiment described herein.

FIG. 1 shows illustrative machine-readable optical label 100. MRL 100 includes data zone 101. Data zone 101 includes light and dark modules that encode executable instructions. MRL 100 includes alignment marker 103. Alignment marker 103 is defined by an outer border that includes light and dark modules, an inner border of light modules and a dark module in the center.

MRL 100 also includes position markers 105, 109 and 115. Position marker 105 is in a top-right corner of data zone 101. Position marker 105 includes an outer square-shaped border of dark modules and an inner border of light modules surrounding diamond-shaped core 106 of dark modules. Position marker 109 is in a top-left corner of data zone 101. Position marker 109 includes an outer circular-shaped border of dark modules and an inner border of light modules surrounding diamond-shaped core 108 of dark modules.

Position marker 115 is in a bottom-left corner of data zone 101. Position marker 115 includes an outer shaped border that includes three lines of dark modules. Position marker 115 includes a FLOWCODE logo as part of the outer border. Position marker 115 includes an inner border of light modules surrounding square-shaped core 116 of dark modules.

MRL 100 includes environmental zone 113. Environmental zone 113 includes modules that are not interpreted when MRL 100 is scanned. Environmental zone 113 may include all parts of MRL 100 outside of data zone 101. Environmental zone 113 has been constructed such that it has an appearance that, to a human eye, seems contiguous with the modules of data zone 101. Environmental zone 113 may be constructed such that it does not interfere with the scanning of data zone 101. For example, apparatus and methods described herein may adjust an arrangement of modules within environmental zone 113 to ensure that the modules of environmental zone 113 do not interfere with a scanning of data zone 101.

Environmental zone 113 includes buffer 111. Buffer 111 includes light modules that space data zone 101 apart from modules of environmental zone 113. Apparatus and methods described herein may adjust a width of buffer 111 to ensure that environmental zone 113 does not interfere with a scanning of data zone 101. Apparatus and methods described herein may adjust a width of buffer 111 to ensure that environmental zone 113 does not interfere with a scanning of data zone 101 and environmental zone 113 has an appearance that, to a human eye, seems contiguous with the modules of data zone 101.

MRL 100 includes circular border 107. Border 107 may be included in environmental zone 113. Apparatus and methods described herein may adjust a line thickness, shape, color or any other suitable design choice of border 107. Apparatus and methods described herein may ensure that border 107 does not interfere with a scanning of data zone 101. Apparatus and methods described herein may arrange modules of environmental zone 113 within a space between data zone 101 and border 107.

MRL 100 may be displayed on a screen. A viewer may scan MRL 100 using a scanning device such as a mobile device. Data zone 101 may encode any suitable information such as a uniform resource locator ("URL"), contact information associated with a business or other alphanumeric information. Data zone 101 may encode instructions, that when scanned, trigger the scanning device to perform a target action or function. The information encoded in data zone 101 may be extracted by a native application or a third-party application running on the scanning device.

Data zone 101 may conform to an encoding specification for a Quick Response ("QR") code. MRLs described in connection with this disclosure may be any suitable scannable machine-readable code. Other illustrative machine-readable codes include any suitable linear or two-dimensional matrix barcodes, such as Aztec code, ShotCode, SPARQCode, and the like. Other illustrative machine-readable codes include any suitable one dimensional or three-dimensional machine-readable codes.

Data zone 101 may encode a set of instructions that may be repeatedly scanned by multiple viewers and/or scanning devices. For example, MRL 100 may be included in a resultant video file that is distributed to multiple viewers. Each of scan of MRL 100 may extract the identical information from data zone 101. Even though each scanning device may extract the same information from data zone 101, the particular content that is presented on a scanning device may be dynamically customized for each viewer.

In other embodiments, multiple resultant video files may be created. Each resultant video file may include an MRL that encodes a unique identifier. To a human viewer, each resultant video file may include a MRL that has the same aesthetic appearance as MRL 100. However, a scanning device may extract the unique identifier encoded in the data zone of each scanned MRL. The particular content that is presented on a scanning device may be dynamically customized based on the extracted unique identifier.

Figure 2:
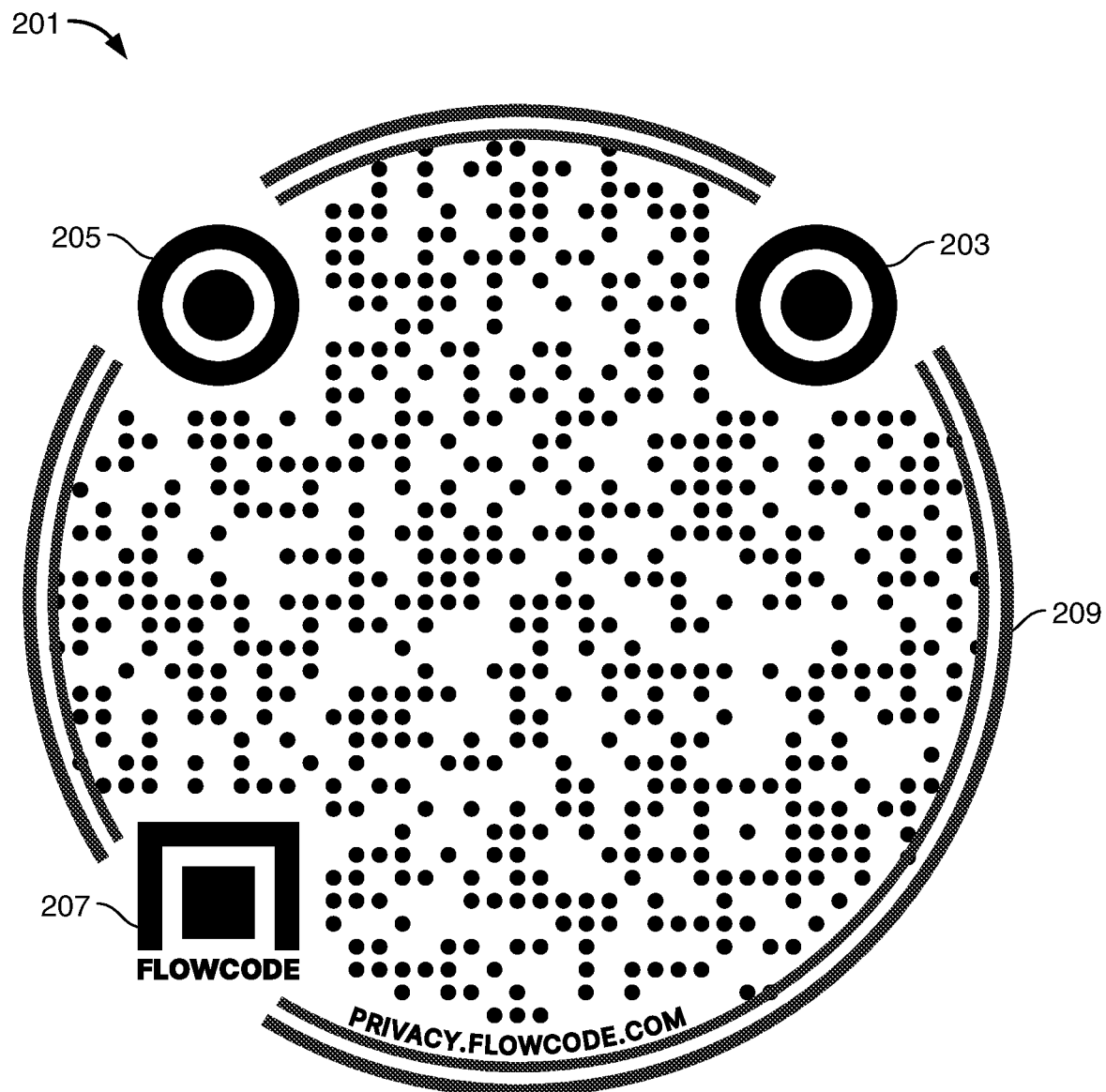
FIG. 2 shows an illustrative machine-readable label in accordance with principles of the disclosure.

FIG. 2 shows illustrative MRL 201. MRL 201 is optimized for scan recognition when displayed electronically. For example, when displayed electronically, MRL 201 may be scannable by more scanning devices than MRL 100 (shown in FIG. 1). Electronically displaying MRL 201 may include presenting MRL 201 on a screen, using a light source, holographically or any other electronic presentation.

To optimize scan-ability when MRL 201 is presented electronically, outer border 209 includes breaks at position markers 203, 205 and 207. To optimize scan-ability when MRL 201 is presented electronically, one or more of position markers 203, 205 and 207 may protrude beyond outer border 209.

MRL 201 may include a data zone that conforms to an encoding specification for a Quick Response ("QR") code or any other suitable linear or two-dimensional matrix barcodes, such as Aztec code, ShotCode, SPARQCode, and the like.

Figure 3:
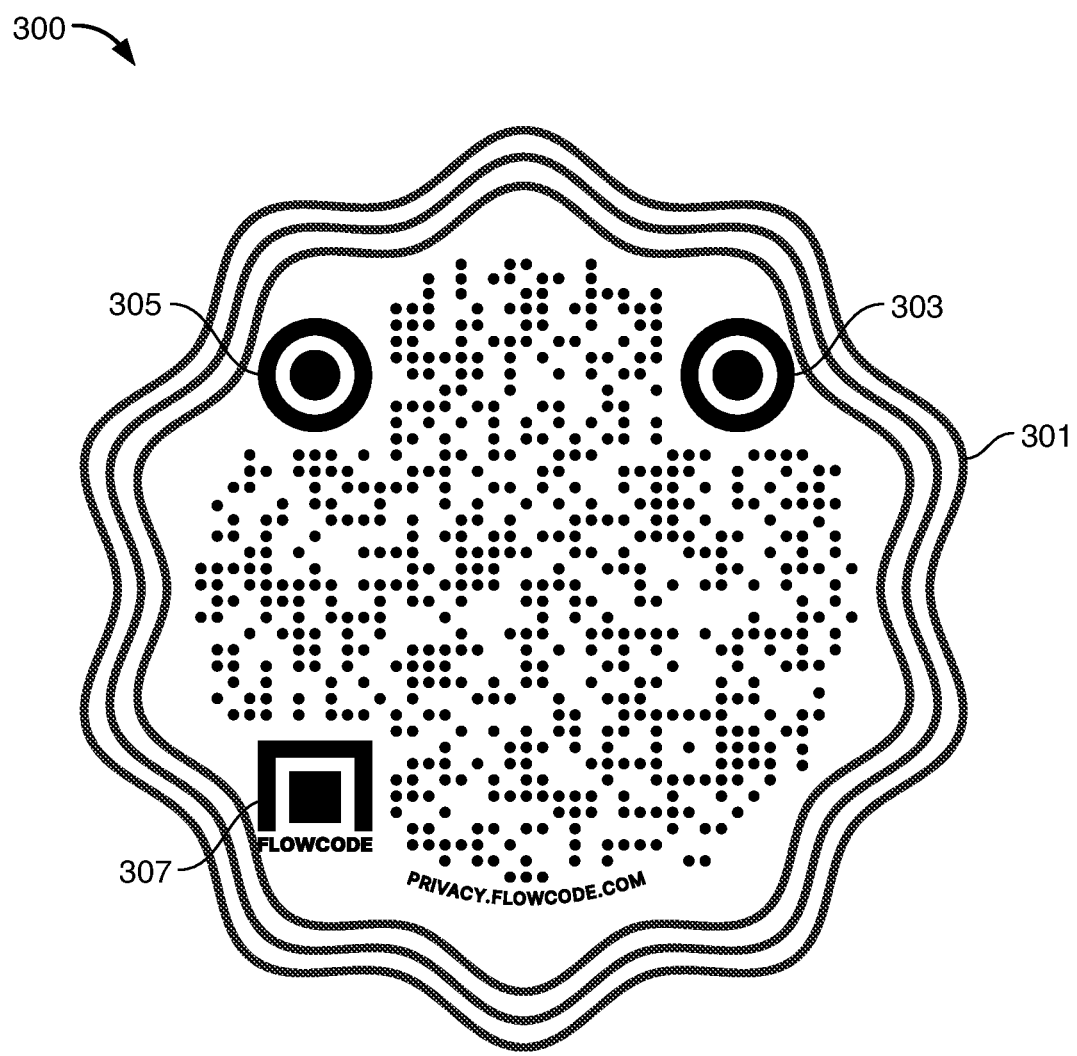
FIG. 3 shows an illustrative machine-readable label in accordance with principles of the disclosure.

FIG. 3 shows illustrative MRL 300. MRL 300 may include one or more features of MRL 100 (shown in FIG. 1) and MRL 200 (shown in FIG. 2). MRL 300 is shown with customized border 301. Customized border 301 may be an animated border. For example, when MRL 300 is displayed electronically, border 301 may be programed to rotate, fade, change color or exhibit any other suitable animation. For example, border 301 may be defined by an animated GIF file. Any animations applied to border 301 may not detract from scan-ability of MRL 300.

When displayed electronically, MRL 300 may be more reliably scannable compared to MRL 100. Scan reliability may be defined by a data zone that can be read within a threshold time (e.g., ≤100 milliseconds) by a threshold number of scanning devices. To optimize scan reliability when MRL 300 is presented electronically, position markers 303, 305 and 307 may be positioned a threshold distance apart from border 307. To optimize scan reliability when MRL 300 is presented electronically, position markers 303, 305 and 307 may be positioned a threshold distance apart from other alternating light/dark modules.

Figure 4:
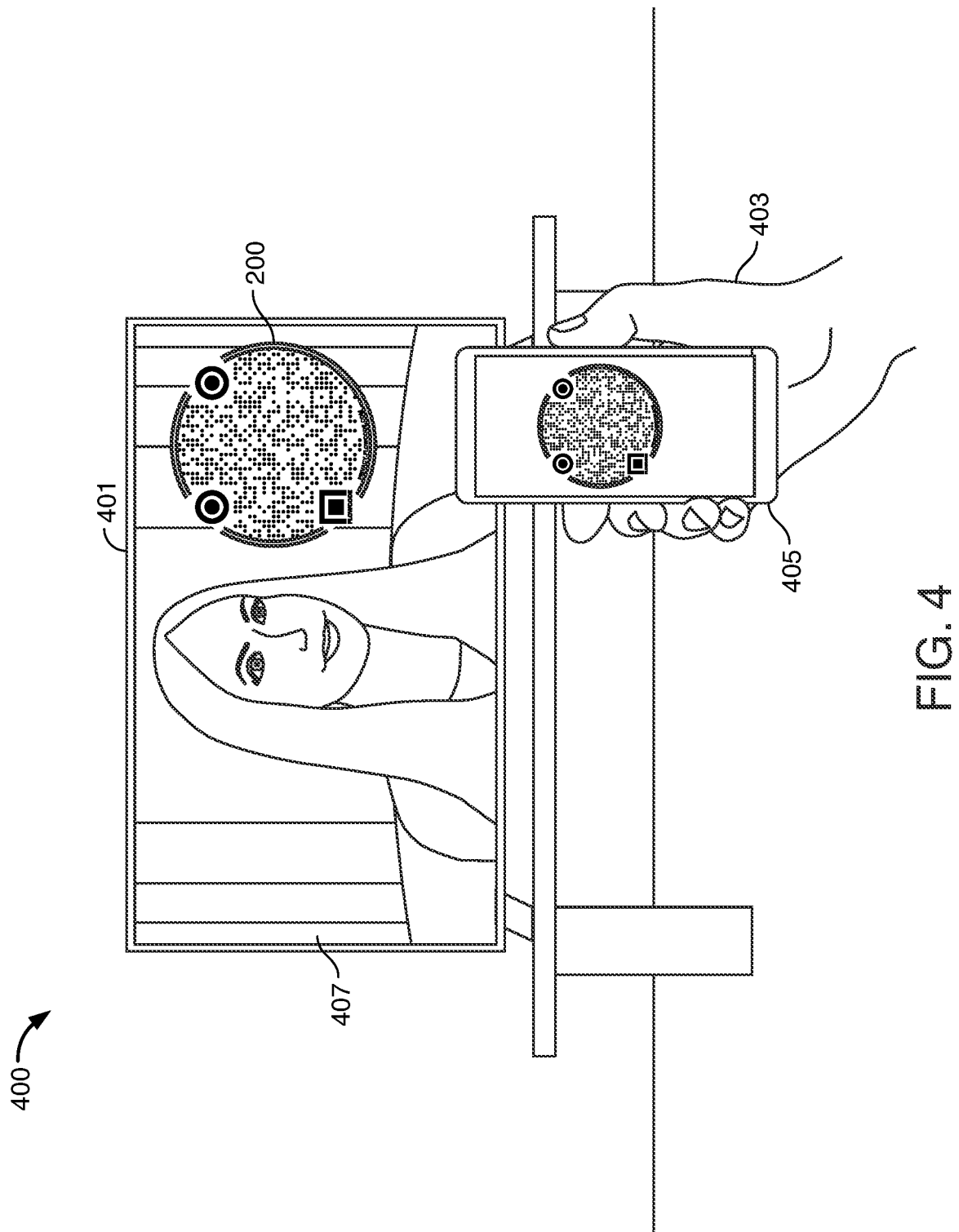
FIG. 4 shows an illustrative scenario in accordance with principles of the disclosure.

FIG. 4 shows MRL 200 displayed adjacent to pre-existing content 407 presented on screen 401. FIG. 4 also shows user 403 has captured a scan of MRL 200 using scanning device 405. In response to scanning MRL 200, user 403 may be provided information associated with pre-existing content 407. For example, the provided information may allow user 403 to purchase one or more products shown in pre-existing content 407, request services described in pre-existing content 407 or request additional information from a producer or distributor of pre-existing content 407. Presentation of MRL 200 in conjunction with pre-existing content 407 allows user 403 to easily connect and engage with the pre-existing content 407 presented on screen 401.

Figure 5:
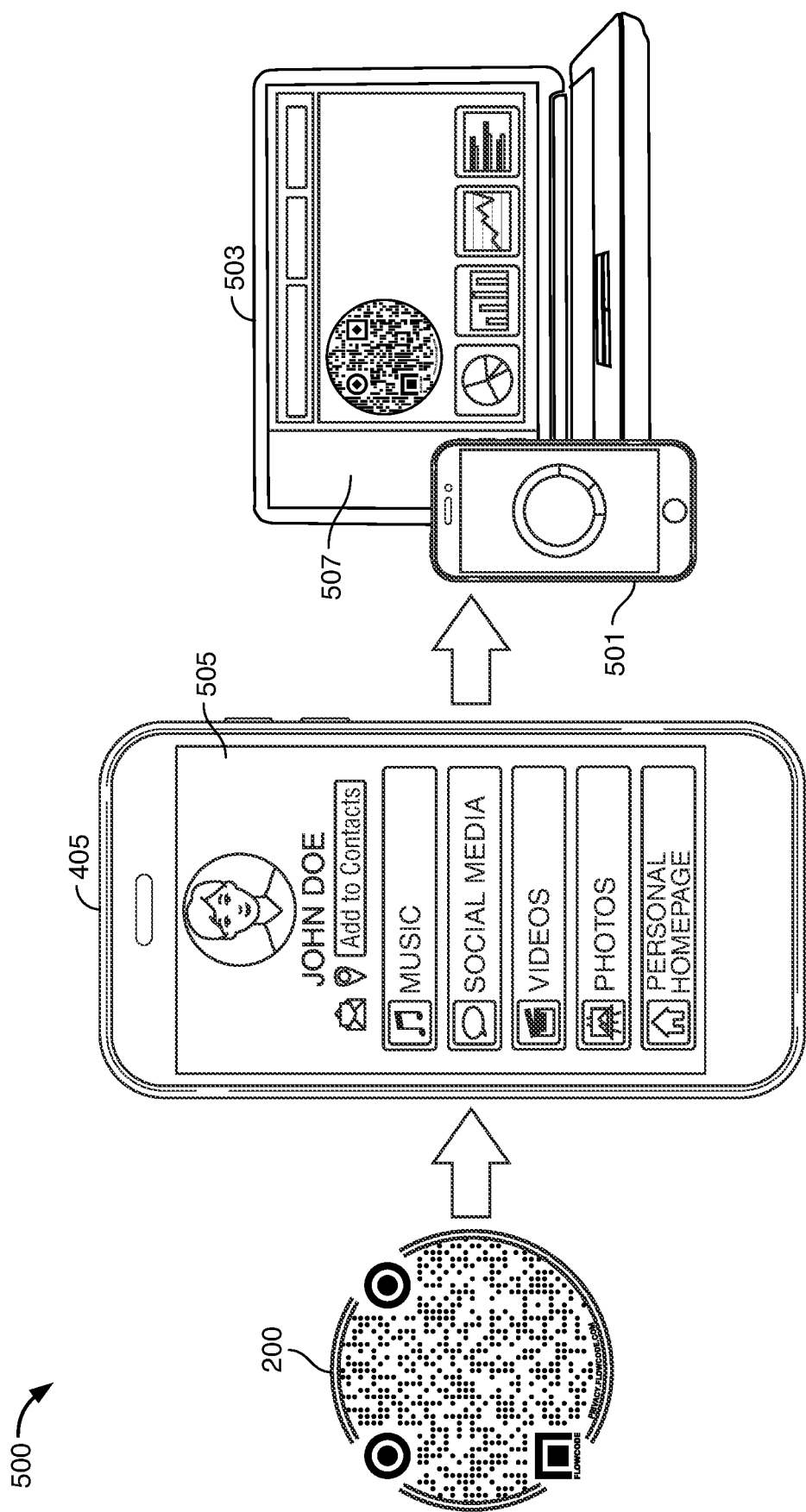
FIG. 5 shows an illustrative process in accordance with principles of the disclosure.

FIG. 5 shows an illustrative system 500. System 500 includes scanning device 405. FIG. 5 shows that MRL 200, when scanned, may trigger presentation of mobile-first landing page platform 501. For example, MRL 200 may encode a URL that directs a browser on scanning device 405 to content 505. Content 505 may be designed for display on the relatively small screens of mobile devices. Content 505 may be dynamically formulated based on scan event details captured when MRL 200 is scanned using scanning device 405.

Content 505 may present links (e.g., "music," "social media," "videos," "photos," "personal homepage") to information associated with content 407 displayed on screen 401. The links presented within content 505 may be ordered differently in response to different sets of captured scans event details. For example, the links of content 505 may be re-ordered based on previous scan activity of user 403, a location of scanning device 403, a media channel that distributes content 407, a location of screen 401 or any other suitable scan event detail(s).

System 500 includes data and analytics platform 503. Platform 503 may compute and display performance metrics 507. Performance metrics 507 may be computed based on scanning activity associated with MRL 200 or viewer action taken after scanning MRL 200 (e.g., clicks on links included in content 505). Performance metrics 507 may be captured using computer code (e.g., a cookie or tracking pixel) embedded in content 505. Performance metrics 507 may include statistics associated with activity of viewers in response to being presented with content 505. Performance metrics 507 may show comparative viewer activity with respect to the different links presented within content 505 or viewer action taken in response to presentation of content 505.

Illustrative performance metrics 507 may include a number of viewers that have scanned MRL 200, a number of viewer impressions of content 505, a number of viewers that have engaged with content 505 after scanning MRL 200. Content presented in response to a scan of MRL 200 may be dynamically changed based on performance metrics 507. Other illustrative performance metrics may include time spent viewing content 505 and viewer engagement with content 505. Exemplary engagement with content 505 may include clicking on displayed links, interaction with a chatbot, clicks, add to cart or other website browsing activity. FIG. 5 shows that illustrative performance metrics 507 may be accessible on mobile device 501.

Figure 6:
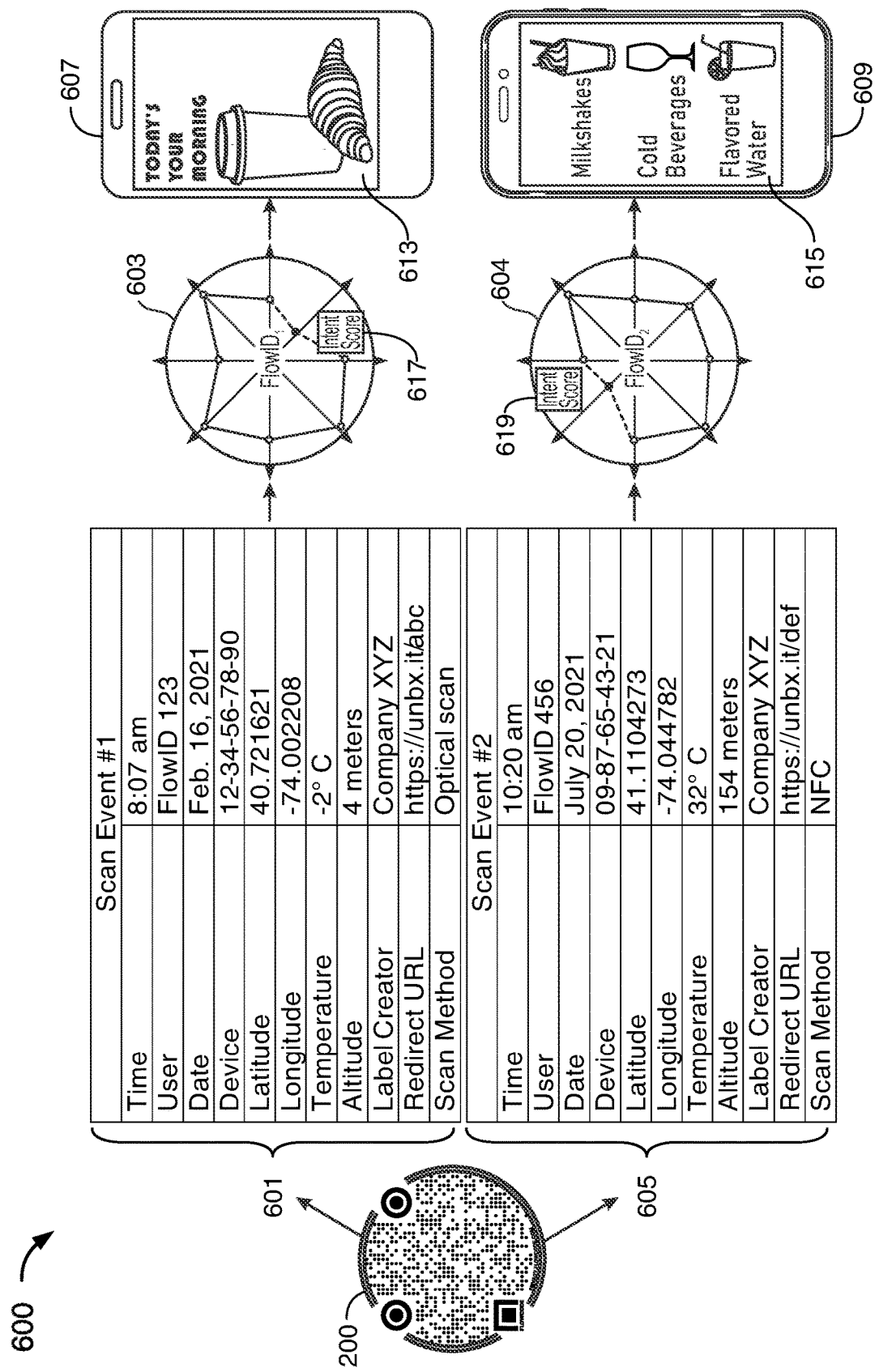
FIG. 6 shows an illustrative process in accordance with principles of the disclosure.

FIG. 6 shows illustrative scenario 600. Scenario 600 shows illustrative scan event details 601 captured when scanning device 607 scans MRL 200 (scan event #1). Scenario 600 shows that based on scan event details 601, content 613 is presented on scanning device 607. Scenario 600 shows illustrative scan event details 605 captured when scanning device 609 scans MRL 200 (scan event #2). Scenario 600 shows that based on scan event details 605, content 615 is presented on scanning device 609.

Based on scan event details 601 and relationships stored in CIG 603, intent index score 617 is computed in response to the scan of MRL 200 by scanning device 607. Based on scan event details 605 and relationships stored in CIG 604, intent index score 619 is computed in response to the scan of MRL 200 by scanning device 609. CIG 603 may include logical relationships linking offline scan event details (e.g., scan time, MRL location) associated with scanning device 607 to online activity (e.g., clicks or other engagement with online content) associated with scanning device 607.

Machine learning algorithms, such as a deep neural network, may be applied to scan event details 601 to formulate content 613 presented on scanning device 607 in response to scan event #1. Machine learning algorithms, such as a deep neural network, may be applied to scan event details 605 and formulate content 615 presented on scanning device 609 in response to scan event #2.

CIG 604 may include logical relationships linking offline scan event details associated scanning device 609 to online activity associated scanning device 609. Scenario 600 shows that an intent index score (e.g., 617 and 619) may be computed based on captured scan event details. The intent index score may define potential actions or content that may be presented in response to a scan of MRL 200. For example, scenario 600 shows that based on temperature (cold) and time (early morning), content 613 is presented on scanning device 607. Scenario 600 shows that based on temperature (hot) and time (mid-morning), content 615 is presented on scanning device 609.

$FlowID_1$ shown in connection with CIG 603 and $FlowID_2$ shown in connection with CIG 604 represent unique identifiers that link a scan activity to a specific scanning device or viewer. In other embodiments, a CIG (not shown) may be computed that links trackable electronic activity of multiple viewers to one or more scans of MRL 200.

A FlowID may be assigned to MRL 200 and may be encoded in the data zone of MRL 200. The FlowID assigned to MRL 200 may correlate all scans of MRL 200 across a spectrum of viewers and scanning devices. A CIG associated with the FlowID assigned to MRL 200 may link scan event details and associated with all scanning devices that scan MRL 200 and all viewer activity in response to scanning MRL 200. A CIG associated with the FlowID assigned to MRL 200 may link trackable electronic viewer activity in response to scans of MRL 200 to a specific size screen, time, a video stream distributed by a particular media channel at a particular time, or any other scan event detail associated with a scan of MRL 200.

In some embodiments, a user interface and/or application program interface ("API") may provide access to CIGs 603 and 604 and a computer system that computes CIGs 603 and 604. Providing such access via an API may allow third-party applications to submit additional attributes the computer system that may be used to calculate an index score of CIG. For example, a provider of digital media may include subscriber information in a set of scan event details to generate an index score for the provider subscribers.

Figure 7A:
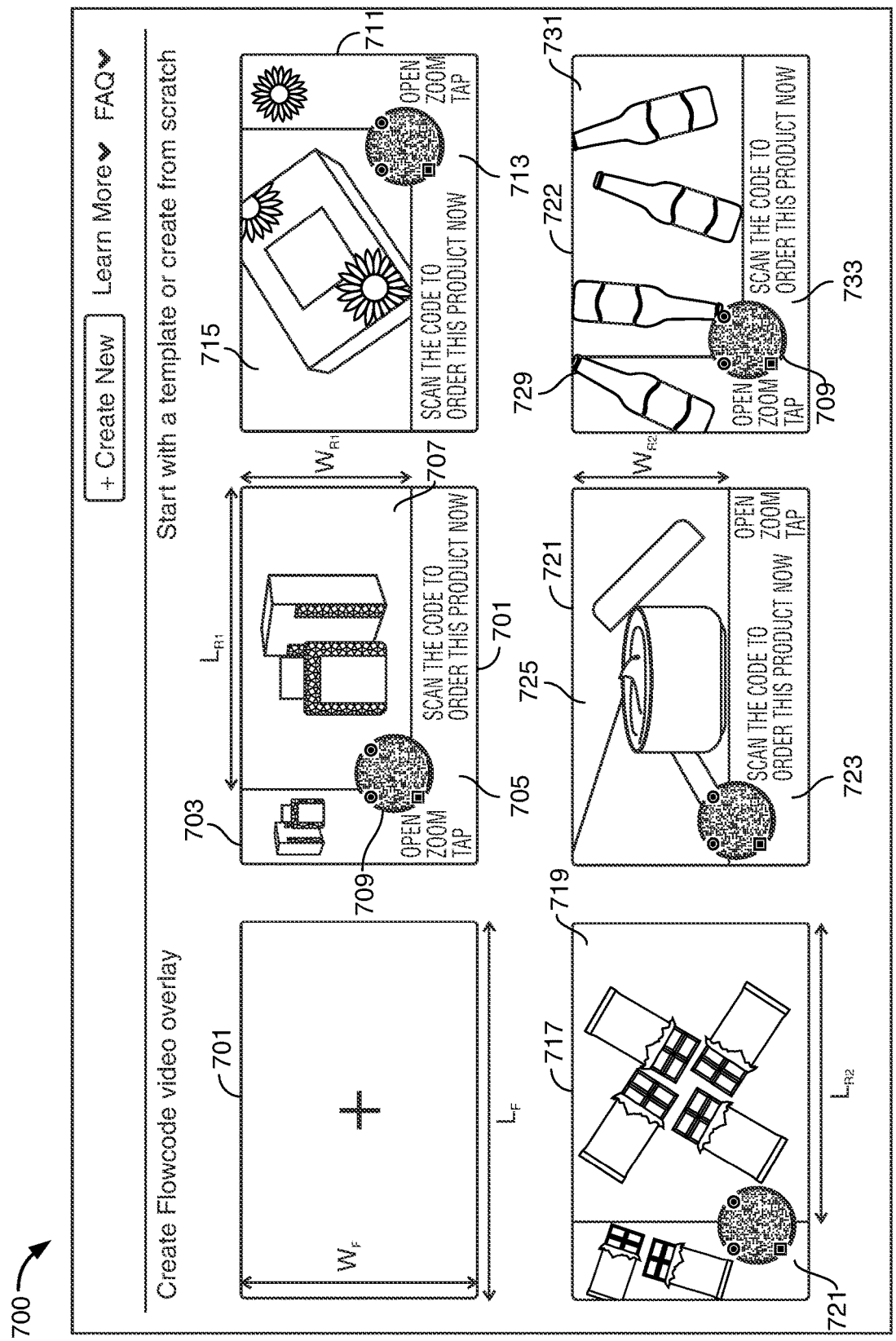
FIG. 7A shows illustrative features of a software tool in accordance with principles of the disclosure.

FIG. 7A shows illustrative user interface 700. User interface 700 provides access to software tools for embedding a MRL into a video file. Interface 700 shows illustrative templates 703, 711, 717, 721 and 722 for positioning a MRL within exemplary video frame 701. Video frame 701 includes width $W_F$ and length $L_F$. Width $W_F$ and length $L_F$ may define an "aspect ratio" for video frame 701. Width $W_F$ and length $L_F$ of video frame 701 may be determined based on a video file uploaded by a user. Dimensions of video frame 701 may be determined based on a size of video frames within the uploaded video file.

In some embodiments, pre-existing content 707 may be resized to fit within width $W_{R1}$ and length $L_{R1}$. Pre-existing content 707 may have originally been sized for display within width $W_F$ and length $L_F$ of video frame 701. Pre-existing content 707 may have originally extended all of the area of video frame 701 defined by $W_F \times L_F$. Pre-existing content 707 may be resized to create space 705 between an outer border of video frame 701 and the area defined by $W_{R1}$ and $L_{R1}$. An area of space 705 may be defined by: $(L_F \times W_F) - (L_{R1} \times W_{R1})$.

In other embodiments, space 705 may be overlaid on top of any pre-existing content included in video frame 701 and outside an area defined by width $W_{R1}$ and length $L_{R1}$. Space 705 may obscure pre-existing content included in video frame 701 that is underneath space 705. An opacity of any content included in space 705 may be adjusted to allow viewing of any pre-existing content positioned underneath space 705.

Template 703 shows that MRL 709 has been embedded, at least partially, within space 705. Template 703 shows that MRL 709 overlaps, at least partially, with pre-existing content 707. The overlap of MRL 709 and pre-existing content 707 may correspond to a buffer zone of template 703. The buffer zone includes an area that is outside space 705. MRL 709 may be allowed to extend into the buffer zone when it is determined that MRL 709 will only obscure background aspects of pre-existing content 707. When foreground aspects of pre-existing content 707 are displayed in the buffer zone, MRL 709 may be positioned entirely within space 705.

In some embodiments, when content in a buffer zone is determined to include foreground aspects, space 705 may be enlarged. Enlarging space 705 may further resize pre-existing content 707 and allow MRL 709 to fit entirely within the enlarged space 705. In some embodiments, when content in a buffer zone is determined to include foreground aspects, MRL 709 may be made smaller to avoid obstructing foreground content.

Template 711 shows that pre-existing content 715 occupies an area defined by width $W_{R1}$ and length $L_{R1}$. Template 711 includes space 713. Space 713 occupies the same amount of area within frame 701 as space 705. However, spaces 713 and 705 are positioned as mirror image of each other (e.g., reflected about $W_F$) and positioned in different parts of video frame 701. Similarly sized spaces may be positioned elsewhere within video frame 701. For example, spaces 705 and 713 may be reflected about $L_F$.

Template 717 shows that pre-existing content 719 occupies an area defined by width $W_F$ and length $L_{R2}$. Template 717 includes space 721 which does not reduce $W_F$. A buffer zone associated with template 717 may be larger or smaller than a buffer zone associated with templates 703 or 711. Template 717 may be referred to as a "side rail only" template. Template 717 may leave more room for pre-existing content 719 than templates 703 or 711.

Template 721 shows that pre-existing content 725 occupies an area defined by width $L_F$ and length $W_{R2}$. Template 721 includes space 723 which does not reduce $L_F$. A buffer zone associated with template 721 may be larger or smaller than a buffer zone associated with templates 703, 711 or 717. Template 721 may be referred to as a "bottom only" template. Template 721 may leave more room for pre-existing content 725 than templates 703 or 711.

Template 722 shows that space 733 may include educational text (e.g., "SCAN THE CODE TO ORDER THIS PRODUCT NOW"), MRL 709 and image 729. Template 722 shows that content included in space 733 may be configured to appear contiguous with content 731. For example, template 727 shows that image 729 appears to follow a pattern of other bottles shown in pre-existing content 731. In some embodiments, pre-existing content 731 may correspond to a still image of a single video frame. In some embodiments, image 729 may be pre-existing content of a video frame. The part of space 733 overlapping image 729 may be transparent and allow viewing of image 729.

In some embodiments, software tools may embed an MRL, text or images into video frame 701 without resizing pre-existing content included in video frame 701. For example, an embedded MRL, image or text may obscure pre-existing content included in frame 701. In some embodiments, software tools accessible via user interface 700 may detect background content of a video frame and position the MRL such that only the background content is obscured by the MRL.

In some embodiments, the software tools may locate one or more video frames where background content occupies an area (e.g., a buffer zone) within a video frame that is large enough to embed a reliably scannable MRL, image or text without obscuring non-background content. The software tools may automatically embed the MRL into the buffer zone of such video frames.

In some embodiments, user interface 700 may build a template based on pre-existing template created by a user. For example, a user may build a first template. The user may generate a second template that includes content extracted from the pre-existing template. Such extracted content may include images, colors, text, a MRL, animations or any other design choices. The second template may include a space having a different orientation or dimensions than the first template. User interface 700 may automatically adapt the extracted content for insertion into a new template. For example, user interface 700 may automatically resize and image or otherwise scale content for insertion into a section of the new template. The section of the new template may have dimensions that are different from dimensions of the extracted content.

Figure 7B:
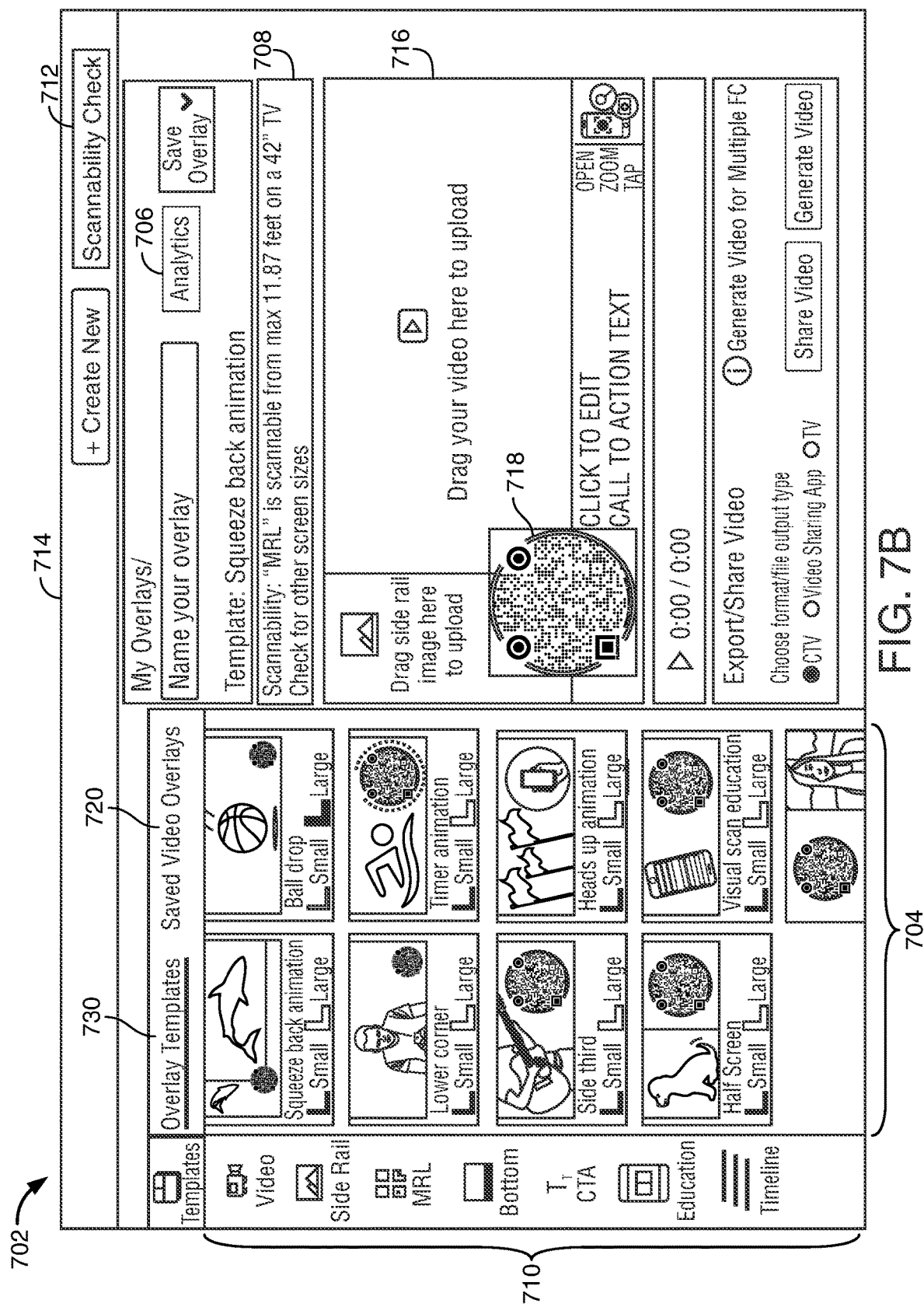
FIG. 7B shows illustrative features of a software tool in accordance with principles of the disclosure.

FIG. 7B shows illustrative view 702 of user interface 714. User interface 714 provides access to software tools for embedding a MRL into a video file. User interface 714 may include one or more features of the user interface shown above in FIG. 7A.

FIG. 7B shows that user interface 714 includes illustrative templates 704 accessible via tab 730. Each of templates 704 may position a MRL and associated template content within a video frame. For each of templates 704, a user may select a large or small version. The large version may include a larger size MRL than the smaller version.

View 702 also shows that interface 714 includes tabs 710. Tabs 710 provide access to software tools for customizing sections of template 716. A user may utilize functionality provided by tabs 710 in any sequential order. User interface 714 may only include tabs 710 that customize sections of template 716. Tabs that may provide access to software tools for customizing other templates (e.g., one or more of templates 704) may not be displayed to a user that has selected template 716.

As a user enters customized inputs for a section of template 716, a resultant video file that includes the customized inputs may be rendered in real-time. Each user edit to a section of a template may be saved in real time. A saved first section of a template may be inserted into a same or different size second section of the template. A saved section of a first template may be inserted into a same or different size section of a second template. The second template may be another instance of template 716 or any other template. A saved section may be automatically resized and/or reformatted for insertion into a second section or second template.

View 702 shows that user interface 714 includes scan-ability information 708. Scan-ability information 708 shows a user scan reliability limits for an MRL embedded in template 716. View 702 shows that when MRL 718 is displayed on a on a 42" screen, MRL 718 is reliably scannable from maximum distance of 11.87 feet away from the screen. A user may click scan-ability check button 712 to check scan-ability information for other screen sizes or MRL designs.

View 702 also shows that user interface 714 provides access to analytics 706. Analytics 706 may include performance metrics (e.g., 507 shown above in FIG. 5) associated with template 714. Analytics 706 may include performance metrics generated by distribution of resultant videos files by other users who have embedded an MRL in video frames using template 716. Each user who utilizes template 716 may apply customizations using controls accessible via tabs 710. Analytics 706 may include performance metrics tied to template 710 and to specific user customizations made to template 716. Analytics 706 may be updated in real-time. Analytics 706 may be updated in real-time based on detected scans of MRL 718 by viewers. Viewer scans MRL of 718 may be detected by a redirect service.

Figure 7C:
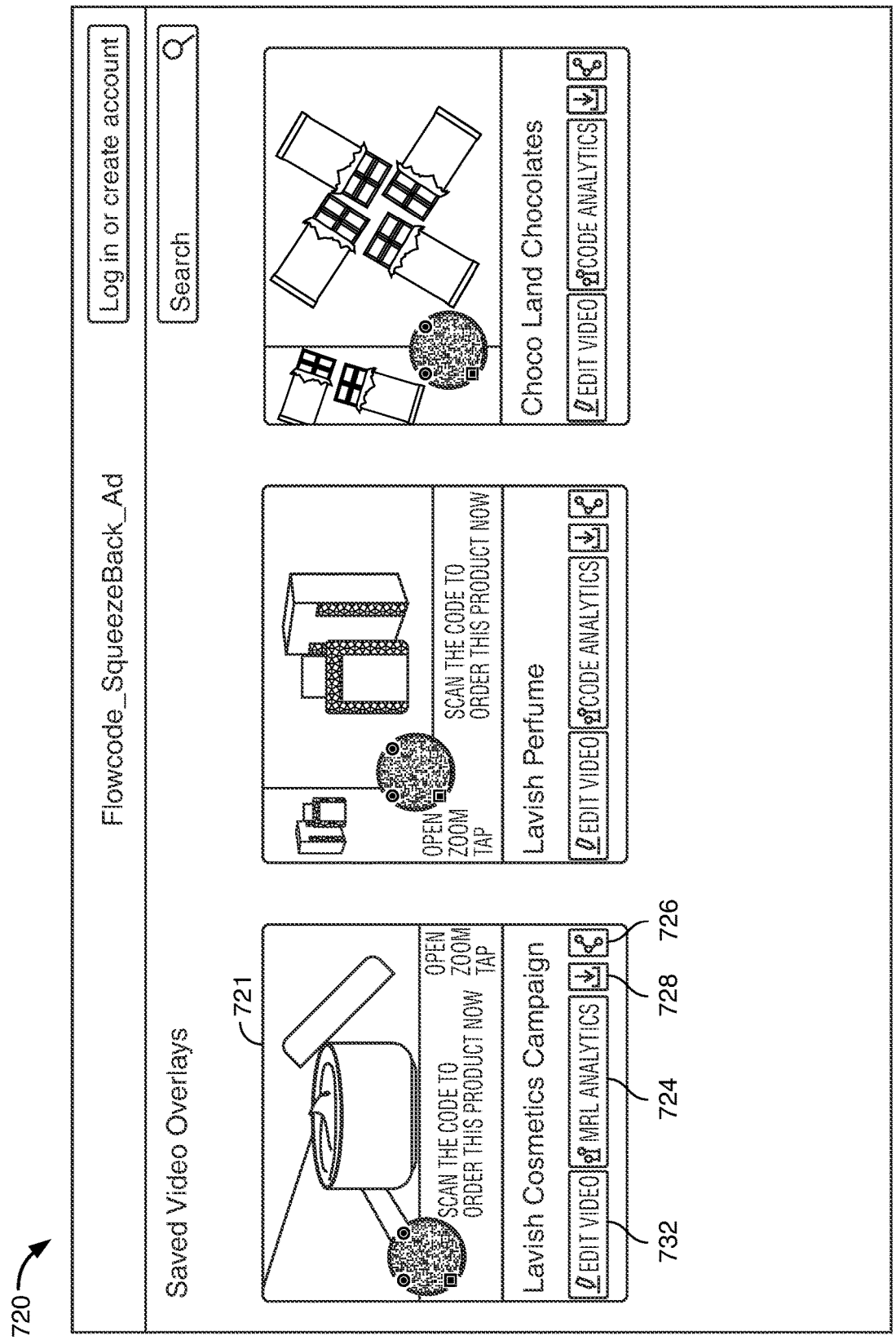
FIG. 7C shows illustrative features of a software tool in accordance with principles of the disclosure.

FIG. 7C shows illustrative "saved video overlays." A saved video overlay may include an overlay designed by a user (e.g., using interface 802, described below) and included in one or more video frames of a resultant video file. For example, saved overlay 720 may have been designed using template 721 (shown in FIG. 7A).

FIG. 7C shows that a user may access button 732 to edit the resultant video file. For example, a user may change a color associated with a section of saved overlay 720. A user may access button 724 to view MRL analytics generated for saved overlay 720. When a user click button 724, software tools may detect an MRL included in saved overlay 720. The software tools may generate a deep-link the user directly to a reporting page that includes detailed analytics generated based on scans of one or more MRLs included in saved overlay 720.

Viewer scans of the one or more MRLs included in an overlay provide a key for generating analytics associated with the MRLs and other content included in the overlay. For example, based on viewer activity on a landing page displayed in response to scanning an MRL, analytics regarding the efficacy of the overlay may be extrapolated. The scan activity of an MRL embedded in a first overlay may be compared to scan activity of an MRL embedded in a second overlay. Thus, when a user clicks button 732, the user will be presented with detailed analytics associated with saved overlay 720.

FIG. 7C shows that a user may access button 726 to share saved overlay 720 and the associated resultant video file. Using button 726 may allow a user to share a resultant video file that includes saved overlay 720 with others. Clicking button 726 may generate a link to saved overlay 720 and the associated resultant video file that may be accessed without logging in or otherwise having access to software tools for creating saved overlay 720 or a resultant video file.

FIG. 7C shows that a user may access button 728 to save a copy of saved overlay 720 and the associated resultant video file. The user may be provided choices for saving the resultant video file in one or more different video formats.

Figure 7D:
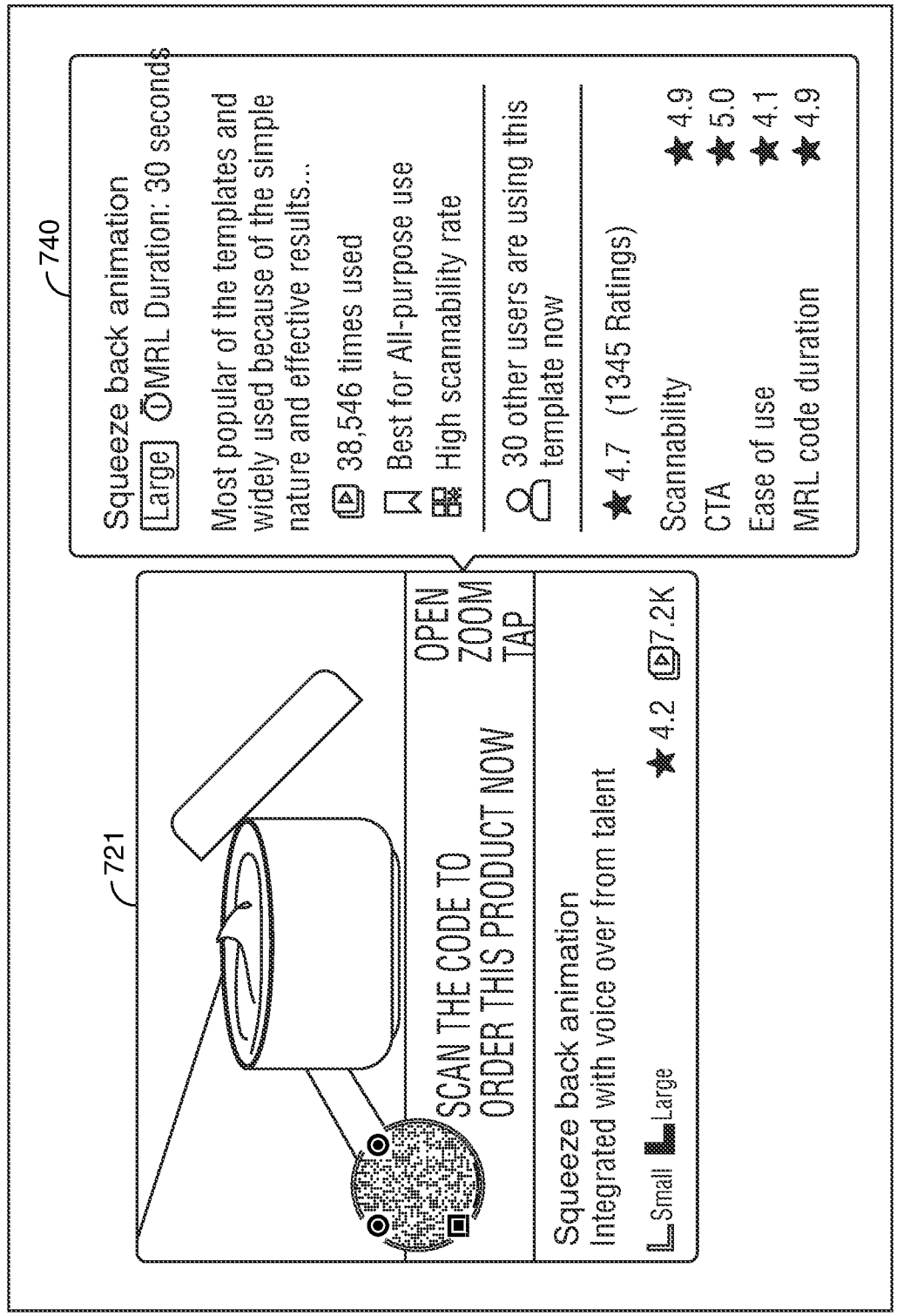
FIG. 7D shows illustrative features of a software tool in accordance with principles of the disclosure.

FIG. 7D shows illustrative analytics 740 that may be associated with saved overlay 720. Analytics 740 may include performance metrics, such as how many times a template (e.g., template 721 shown in FIG. 7A) was used to create a saved overlay (e.g., saved overlay 720). Analytics 740 show that template 721 has been used 38,546 times. Usage of template 721 may also be tracked based on scans of one or more MRLs embedded in a resultant video file created based on template 721. Scans of one or more MRLs embedded in a resultant video file may be detected by a redirect service.

Scans of MRLs embedded in a resultant video file may be human viewer scans or machine viewer scans. For example, human viewers may scan MRL using a scanning device (e.g., mobile phone) when viewing linear television.

Scans of MRLs embedded in a resultant video file may allow for tracking impressions or viewer interaction with content presented on linear television or any other video distribution platform. Tracking impressions or viewer interaction with content presented on linear television is technologically difficult. By definition, linear television content does not allow for viewer interaction with presented content.

Machine viewer scans of an MRL included in a resultant video file may be captured by the autonomous MRL scanning software tool described herein. The autonomous MRL scanning software tool may detect and scan MRLs presented on linear television or any other video distribution platform. MRLs detected by the autonomous MRL scanning software tool may be used to measure a number of impressions or interaction with a resultant video file. A unique identifier included in one or more MRLs may allow software tools to determine which template(s) has been used to create a resultant video file that includes a detected MRL.

Software tools may distinguish between human viewer scans of an MRL and machine viewer scans of the MRL. Human and machine viewer scans may be distinguished based on more or more scan event details associated with a scan. For example, scans captured by the autonomous MRL scanning software tool may be associated with a unique device type or other identifier that distinguishes the machine viewer scans from any other scans.

Analytics 740 show that an MRL included in saved overlay 720 (created using template 721) is a "large" size MRL. A larger MRL may be reliably scannable from a greater distance away from a screen that displays saved overlay 720. Analytics 740 show that saved overlay 720 displays an embedded MRL for 30-seconds. Analytics 740 include real-time feedback, such as showing that thirty (30) other users are currently in the process of using template 721 to create a resultant video file.

Analytics 740 includes machine generated natural language recommendations associated with template 721. Machine generated recommendations for template 721 includes "most popular of the templates and widely used because of the simple nature and effective results . . . " Machine generated recommendations for template 721 includes "best for all purpose use" and "high scannability rate." Such recommendations may be generated based on scans of MRLs included in one or more saved overlays formulated based on template 721.

Figure 12:
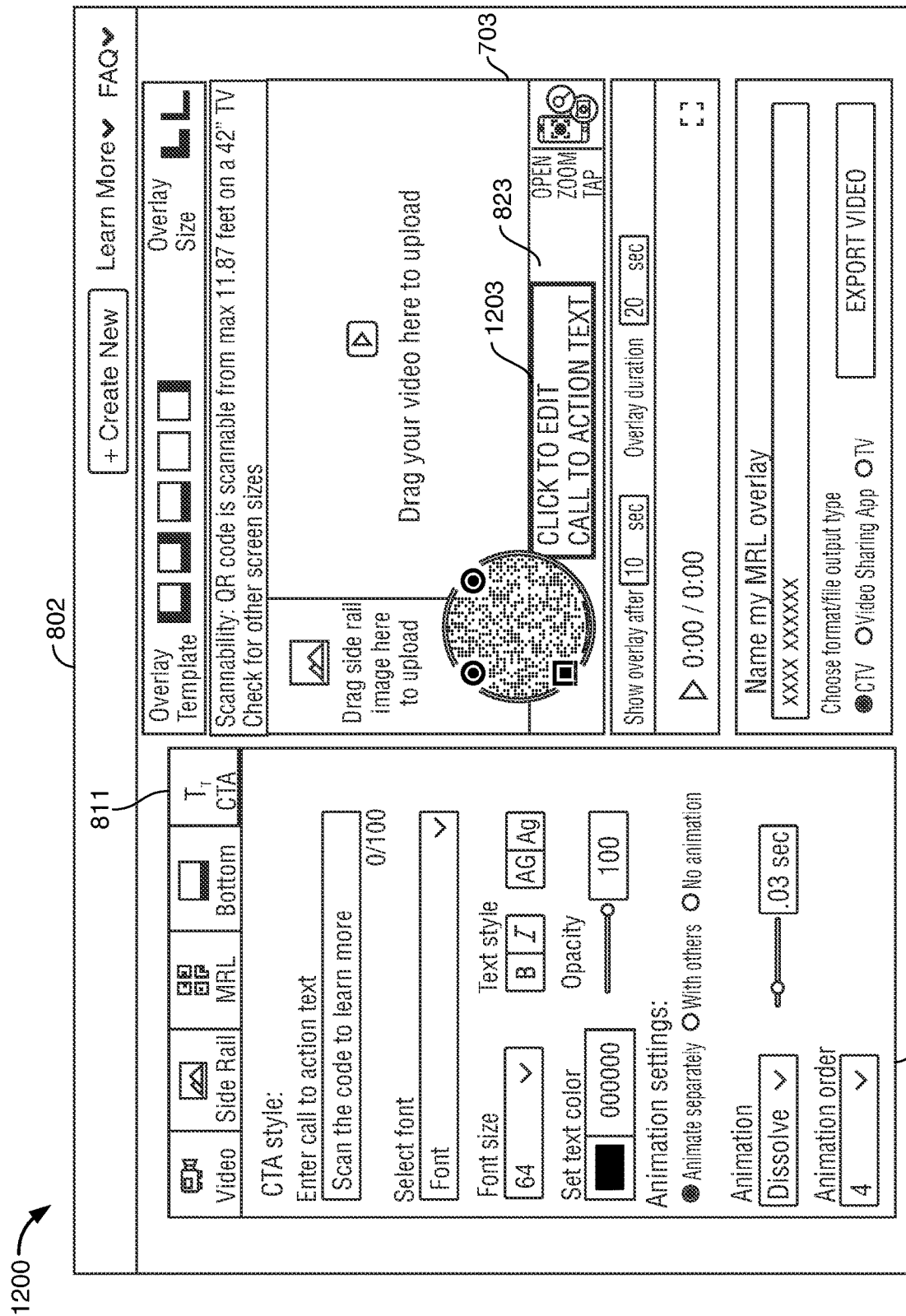
FIG. 12 shows illustrative features of a software tool in accordance with principles of the disclosure.

Analytics 740 includes user reviews or feedback associated with template 721, which was used to formulate saved video overlay 720. Analytics 740 show that template 721 is associated with 4.7 (out of 5) based on 1,345 user ratings. Analytics 740 show that users have associated template 721 with a ranking of 4.9 (out of 5) for scan-ability of MRLs displayed in a resultant video file formulated using template 721. Analytics 740 show that users have associated template 721 with a ranking of 5 (out of 5) for effectiveness of a call to action included in template 721. FIG. 12 (below) shows controls 1201 for customizing a call to action.

Analytics 740 show that users have associated template 721 with a ranking of 4.1 (out of 5) for ease of use. Analytics 740 show that users have associated template 721 with a ranking of 4.9 (out of 5) for MRL duration. MRL duration may refer to how long an MRL is displayed to viewers within a resultant video file.

Figure 8:
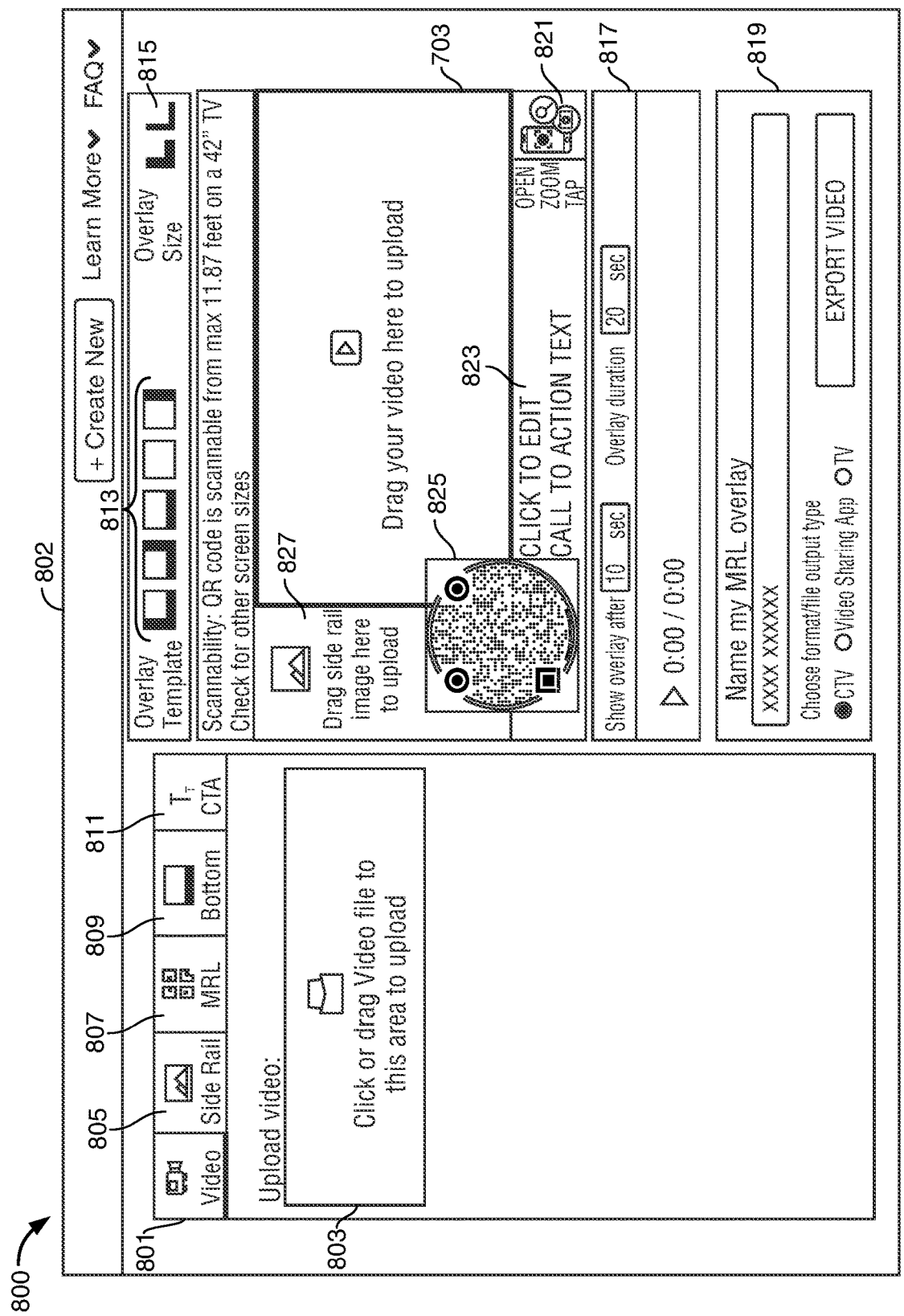
FIG. 8 shows illustrative features of a software tool in accordance with principles of the disclosure.

FIG. 8 shows illustrative view 800 of user interface 802. Interface 802 may be used to construct a template such as templates shown in FIGS. 7A and 7B. Interface 800 includes tabs 801, 805, 807, 809 and 811 for accessing software tools for constructing a template. View 800 shows that tab 801 is activated by a user. Tab 801 provides the user access to control 803, which includes instructions and access to a portal for uploading a video file.

Interface 802 provides access to software tools for formatting a template that will be embedded in a video frame of the video file uploaded using control 803. View 800 shows clickable buttons 813 that allow a user to select an orientation of a space within a template. View 800 shows that a user has selected template 703 and space 705 (shown in FIG. 7A). View 800 shows that a user may change a width of the space using clickable buttons 815. Increasing the "overlay size" may change a size of the MRL included in section 825. A larger MRL may be reliably scannable from a greater distance away from a screen that displays the MRL.

View 800 shows that interface 802 includes controls for adding content to space 705 (shown in FIG. 7). View 800 shows that space 705 is divided into illustrative sections 827, 825, 823 and 821. Interface 802 provides tools for inserting content within each of these sections. For example, a user may insert text into section 823, a logo into section 821, an image into section 827 and an MRL into section 825. In some embodiments, a user may embed a sound file into section 827.

Controls 817 allow a user to identify video frames of the uploaded video that will include template 703. In some embodiments, template 703 may be inserted into a video frame by resizing pre-existing content included in the video frame to make room for space 705. For example, pre-existing content may be cropped out of the video frame or content may be resized such that all the content is visible within a smaller area of the video frame. In some embodiments, space 705 may be overlayed on top of pre-existing content included in the video frame.

Controls 817 allow the user to identify the video frames that will include template 703 based on time that elapses from a start (e.g., $t_0$) of the uploaded video file. View 800 shows that the user has selected to insert template 703 after 10 second of play time (e.g., $t_{10}$). View 800 shows that the user has selected to insert template 703 into each video frame that will be displayed for the 20 seconds after the first 10 seconds of play time (e.g., from $t_{10}$ until $t_{20}$).

Based on user inputs to controls 817, template 703 may be inserted into video frames of the uploaded video file that are displayed to viewers during a 20 second time window that begins 10 seconds after a start time of the uploaded video file. Controls 819 show that the user may assign a new name to a resultant video file that includes video frames that display template 703 starting at $t_{10}$ until $t_{20}$. Controls 819 also show that a user may specify a desired file format for the resultant video file.

Figure 9:
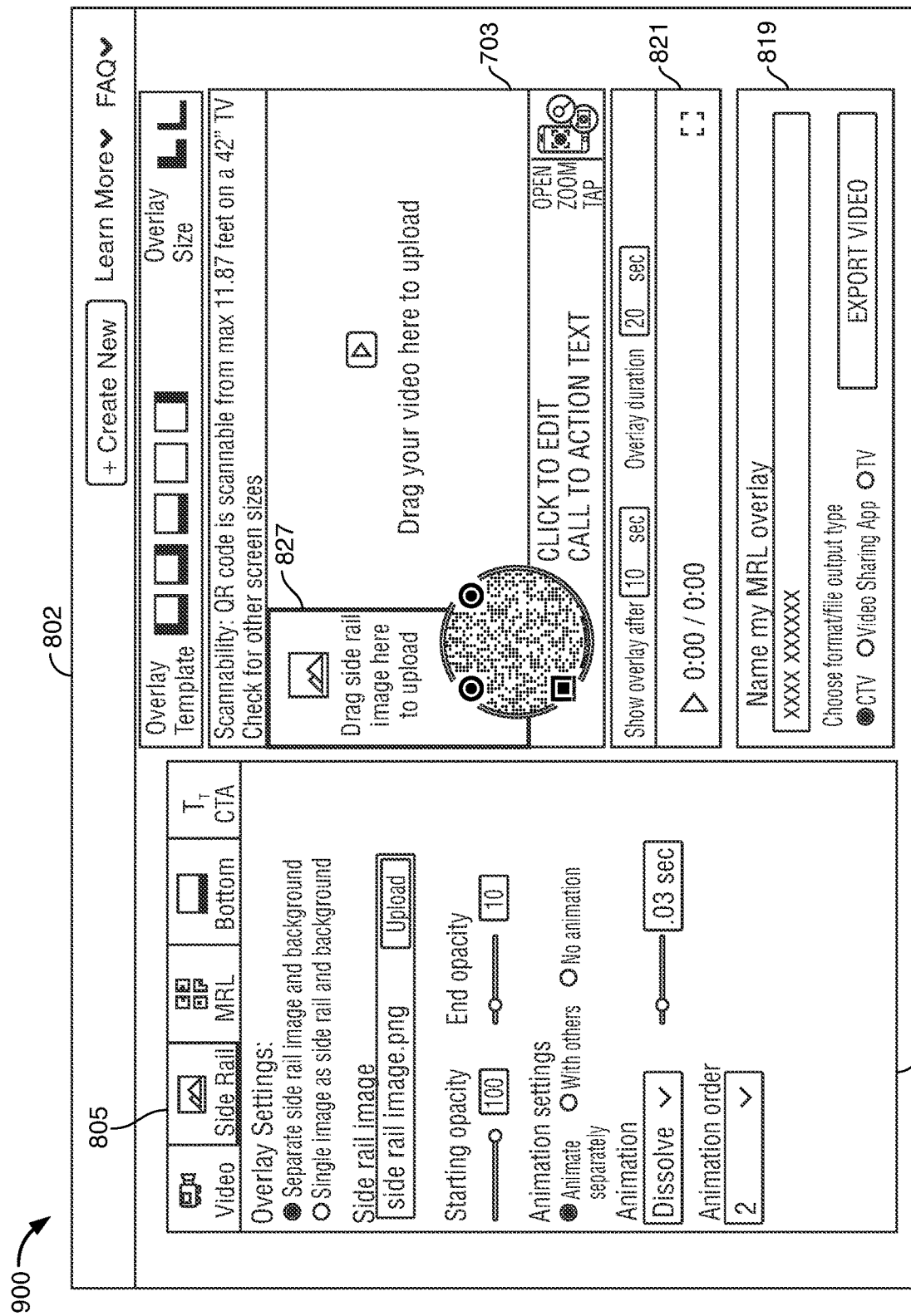
FIG. 9 shows illustrative features of a software tool in accordance with principles of the disclosure.

FIG. 9 shows view 900 of controls 901 accessible via tab 805 of user interface 802. Controls 901 provide functionality for constructing section 827 of template 703. User input for constructing section 827 using controls 901 may be implemented and viewable within section 827 in real time. User input for constructing section 827 using controls 901 may be rendered into a resultant video file in real-time.

Controls 901 allow a user to select an image that will be displayed in sections 827. Interface 802 may automatically resize an image selected for insertion into section 827. For example, interface 802 may crop, shrink or expand the image so that the selected image fills section 827 and is not distorted by display within section 827. In some embodiments, interface 802 may reject a selected image that may be distorted by insertion into section 827.

Controls 901 allow a user to select whether to separate an image and background associated with section 827 or integrate the image into the background of section 827. Separating the background and image allows a user to select a background color that is applied to section 827 independently of any image inserted into section 827. Controls 901 allow a user to adjust an opacity of the selected image or background color. Controls 901 may allow a user to select a background color for section 827 without selecting an image.

Controls 901 allow a user to apply one or more animations to the selected image or other content inserted into section 827. An animation may be selected from a library of animations. The library of animations may allow a user to insert an animation into section 827 that thematically matches pre-existing content displayed in video frames that include template 703.

Figure 10:
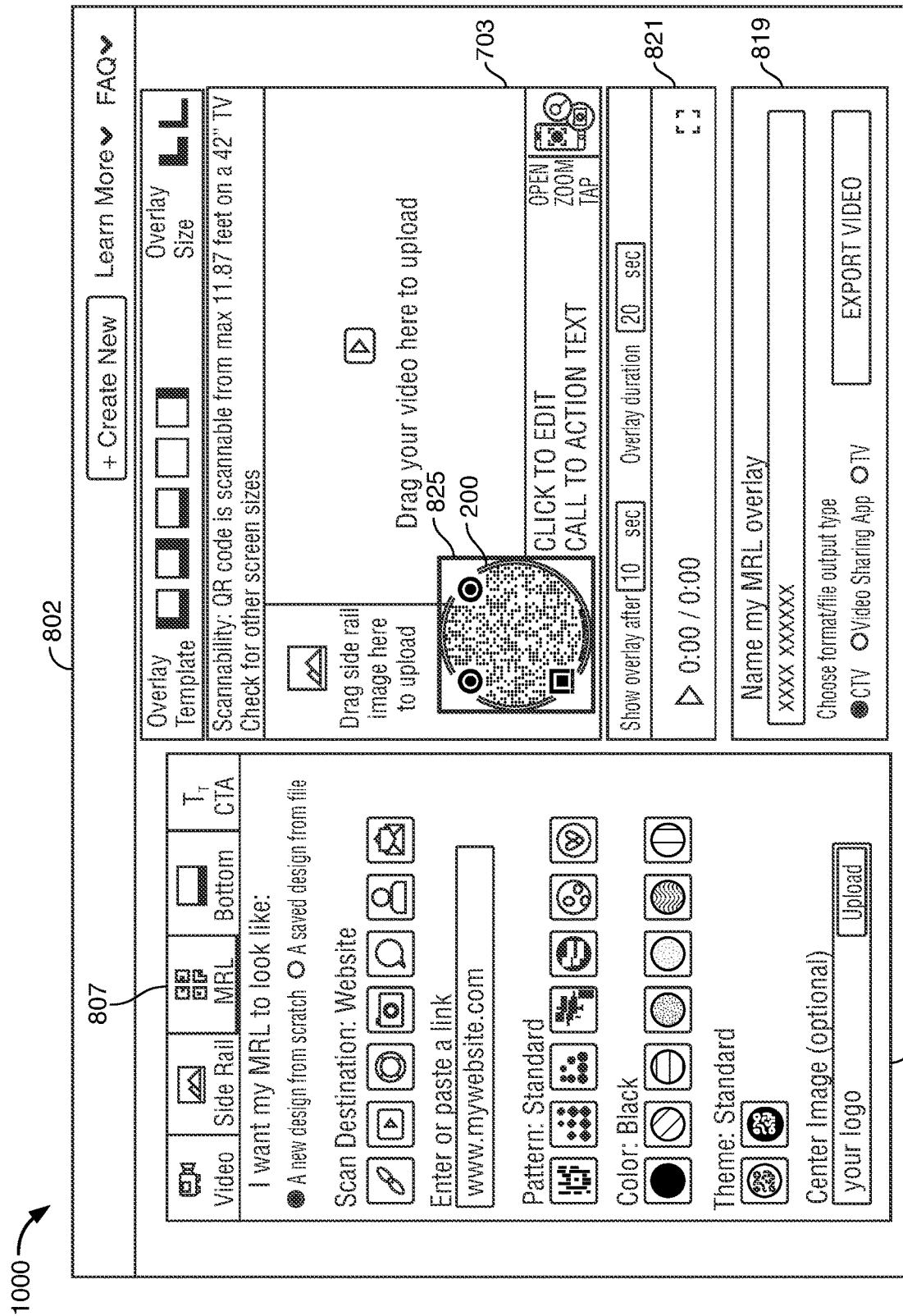
FIG. 10 shows illustrative features of a software tool in accordance with principles of the disclosure.

FIG. 10 shows view 1000 of controls 1001 accessible via tab 807 of user interface 802. Controls 1001 provide functionality for a user to enter design choices that will be utilized to construct an MRL that will be inserted into section 825 of template 703. FIG. 10 shows that section 825 includes MRL 200 as a default MRL.

Controls 1001 allow a user to design a new MRL or utilize a saved MRL design. A saved MRL design may be saved in a remote database. Controls 1001 may integrate with an application program interface associated with a MRL generator and for importing MRL designs stored in the remote database. Controls 1001 allow the user to enter a scan destination that will be encoded in a data zone of the generated MRL. When the generated MRL is scanned, the scanning device will be directed to the scan destination encoded in the data zone.

In some embodiments, controls 1001 may integrate with other tools for generating traceable weblinks. Illustrative traceable weblinks may include Urchin Tracking Parameters ("UTM"). A UTM may identify an MRL, template or other marketing campaign attributes that redirect a viewer to a target webpage. The traceable weblink may be encoded in a data zone of the MRL inserted into section 825.

Controls 1001 allow a user to select a module pattern for the MRL and apply additional design choice to the selected pattern. Illustrative design choices may be applied to modules of the data zone, position pattern detection and/or environmental zone. Illustrative design choices include selecting a pattern, color and theme (e.g., standard or inverted) for modules of the MRL.

A scanning device, such as a smartphone, may be configured to interpret instructions encoded by a pattern of light and dark modules. A scanning device may interpret the pattern of modules as a binary encoded message. A light module may represent a 0, and a dark module may represent a 1. The theme control may toggle which modules are "light" and which modules are "dark."

Controls 1001 may allow a user to select an image that will be positioned within the MRL. Integration of interface 802 with a MRL generator may pipe user input design choices to the MRL generator. Interface 802 may provide remote access, via controls 1001 to the MRL generator. The MRL generator may produce a MRL based on the user input design choices. An illustrative MRL generator is described in U.S. Pat. No. 11,010,650, entitled "Machine-Readable Label Generator," issued on May 18, 2021 and incorporated by reference herein in its entirety.

Controls 1001 may allow a user to apply one or more animations to the MRL inserted into section 825. An illustrative animation may include an animated border. For example, when MRL 200 is displayed electronically, border 107 (shown above in FIG. 1) may be programed (e.g., by overlaying an animated GIF) to rotate, fade, change color or exhibit any other suitable animation. Any such animations may be embedded along with the MRL in a resultant video file. Any animations applied may not detract from scanability of the MRL presented within section 825.

Interface 802 may apply artificial intelligence to limit design options presented to a user accessible via tab 807. For example, certain colors or patterns may not be reliably scannable when the MRL is displayed electronically. Interface 802 may prevent a user from selecting a combination of design choices that is determined, based on artificial intelligence, to produce a MRL that will not be reliably scannable.

Figure 11:
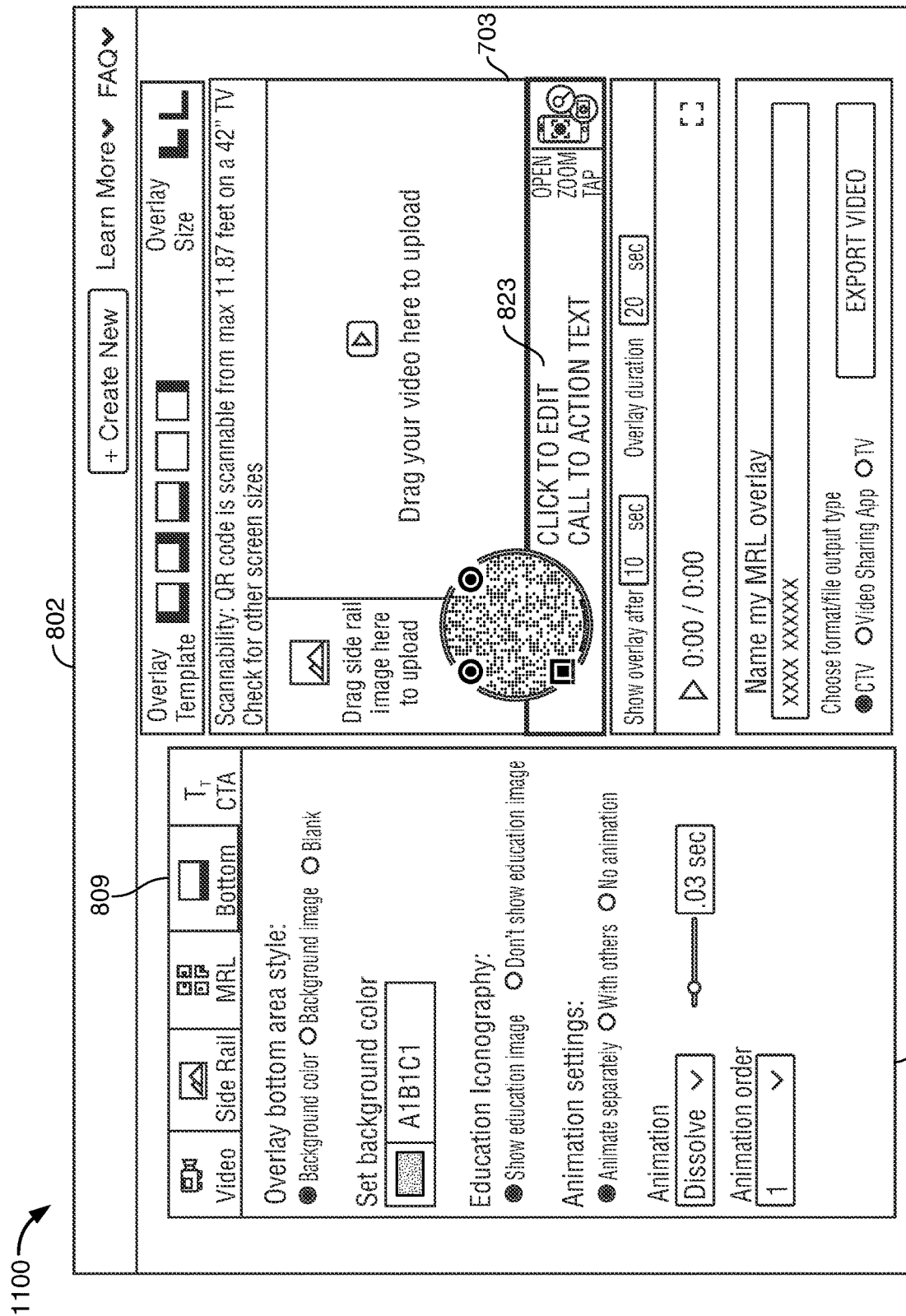
FIG. 11 shows illustrative features of a software tool in accordance with principles of the disclosure.

FIG. 11 shows view 1100 of controls 1101 accessible via tab 809 of user interface 802. Controls 1101 provide access to software tools for constructing section 823 of template 703. Controls 1101 allow a user to configure a background appearance of section 823. View 1100 shows that a user has selected a background color corresponding to hexadecimal color code "A1B1C1" (a blue/gray color).

Controls 1101 show that the user may insert an "educational" image into section 823. An "educational" image may visually show viewers how to scan an MRL. Controls 1101 allow a user to apply one or more animations to the selected image or other content inserted into section 823. In some embodiments, a drop-down list may be provided that allows user to select exemplary educational images. In some embodiments, artificial intelligence may present educational images that, based on performance metrics, have been determined to be most helpful to a target viewer of template 703. An exemplary performance metric may include an educational image associated with the highest number of viewer scans.

In some embodiments, interface 802 may automatically resize an image selected for insertion into section 823. For example, interface 802 may crop, shrink or expand the image so that the selected image fills section 823 and is not distorted by display within section 823.

FIG. 12 shows view 1200 of controls 1201 accessible via tab 811 of user interface 802. Controls 1201 provide functionality for formatting call to action ("CTA") text 1203 inserted within section 823. CTA text 1203 may inform a viewer of the benefits of scanning MRL embedded in section 825. Controls 1201 show the user has entered illustrative CTA text "Scan the code to learn more."

Controls 1201 also allow the user to apply one or more animations to the CTA text. A CTA animation may show a viewer how to scan the MRL embedded in section 825. In some embodiments, a CTA text or animation may be embedded into section 823. An illustrative animation may include showing an exemplary scanning device capturing a scan of the MRL. The MRL shown on a screen of the scanning device may itself be a scanning MRL. Thus, the animation may not prevent a viewer from the scanning the MRL during execution of the animation.

In some embodiments, a drop-down list may be provided that allows user to select exemplary CTA text. In some embodiments, artificial intelligence may present CTA text that, based on performance metrics, have been determined to be most helpful to a target viewer of template 703. Based on performance metrics associated with other MRLs, an optimized CTA text or animation may be determined. Exemplary performance metrics may include CTA text associated with the highest number of viewer scans, highest conversion ratio or viewer interaction with content at the scan destination.

Section 823 may be programmed to be automatically updated with optimized CTA text or animation. In some embodiments, controls 1201 may include a button to access real time statistics on CTA text or animations. Controls 1201 may present CTA text of animations for selection based on the real time statistics.

Controls 1201 allow the user to format the CTA text in a desired font, resize the font, assign a text style, text color and opacity. In some embodiments (not shown), controls 1201 may allow a user to import a custom font. Opacity may control how transparency of a template section. For example, in some embodiments, template 703 may be positioned over pre-existing content included in a video frame. In such embodiments, a higher degree of transparency for a section of template 703 may allow the pre-existing content positioned underneath template 703 to remain visible to a viewer after template 703 is embedded in the video frame.

Figure 13:
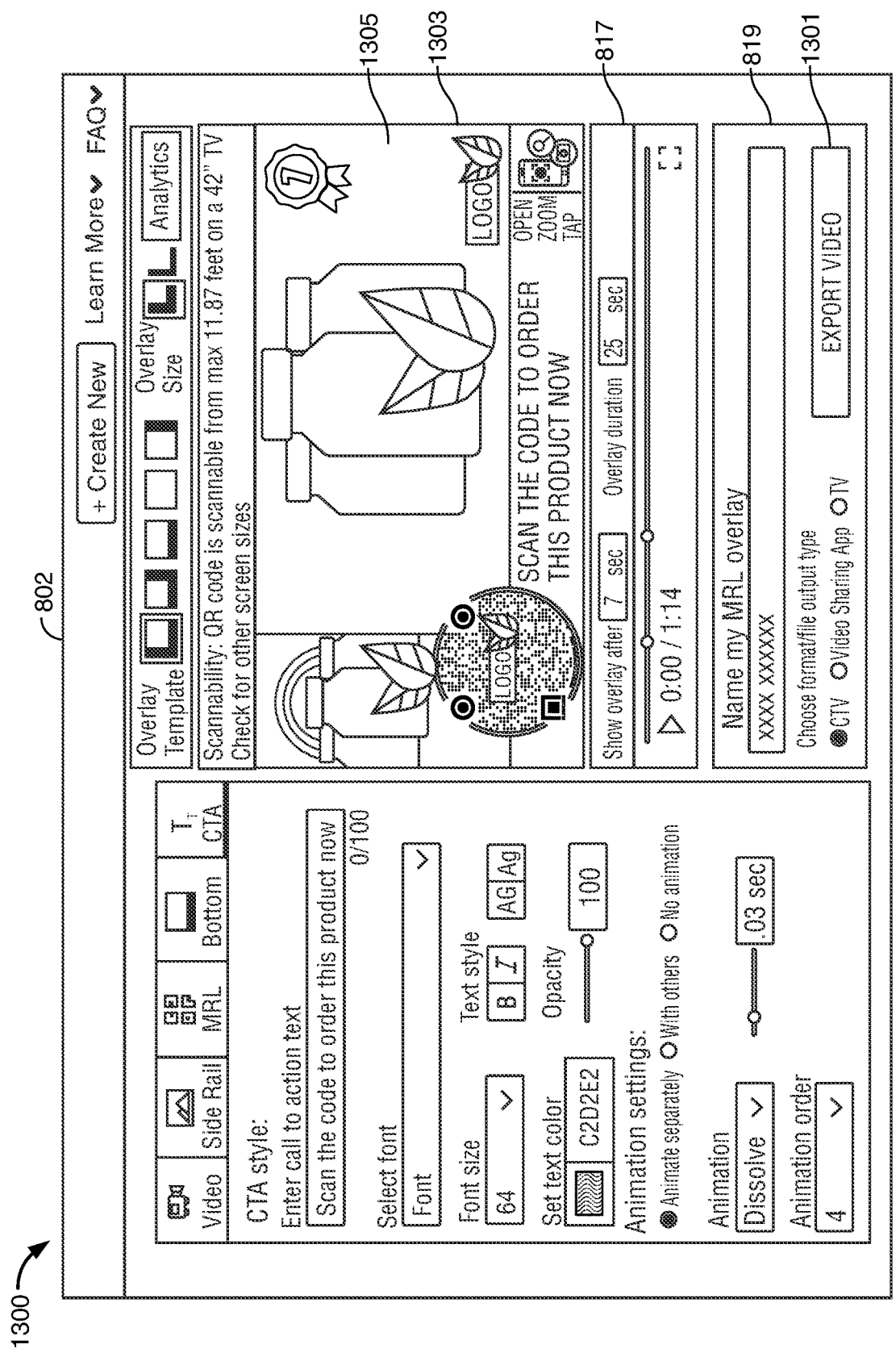
FIG. 13 shows illustrative features of a software tool in accordance with principles of the disclosure.

FIG. 13 shows view 1300 of virtual frame 1303. Virtual frame 1303 has been generated based on user entered design choices applied to template 703 using interface 802. Virtual frame 1303 shows that the user has accessed controls 807 and input design choices to create a custom MRL embedded in section 825. Virtual frame 1303 also shows that the user has accessed controls 817 to specify which video frames within an uploaded video will include the customized template content and pre-existing content shown in virtual frame 1303.

View 1300 shows (e.g., controls 817) that the user has uploaded a video file having a total playtime length of 1 minute and 14 seconds. The user has selected to insert the customized template content shown within virtual frame 1303 after 7 second of play time (e.g., $t_7$). View 1300 shows that the user has selected to display the customized template content shown in virtual frame 1303 for 25 seconds after the first 7 seconds of play time (e.g., from $t_7$ until $t_{25}$). View 1303 shows that user may use button 1301 to render a resultant video file that will include the customized template content of virtual frame 1301 at $t_7$ through $t_{25}$. In some embodiments, a resultant video file may be renders in real-time as the user enters design choices for each of sections 827, 825, 823 and 821.

In some embodiments, controls may be provided for the user to select when, within the total playtime of the uploaded video file, to display one or more target sections of virtual frame 1303. For example, customized template content of section 825 may be displayed for a longer time than customized template content of section 823. Customized template content of section 825 may be displayed before customized template content of section 827.

Figure 14A:
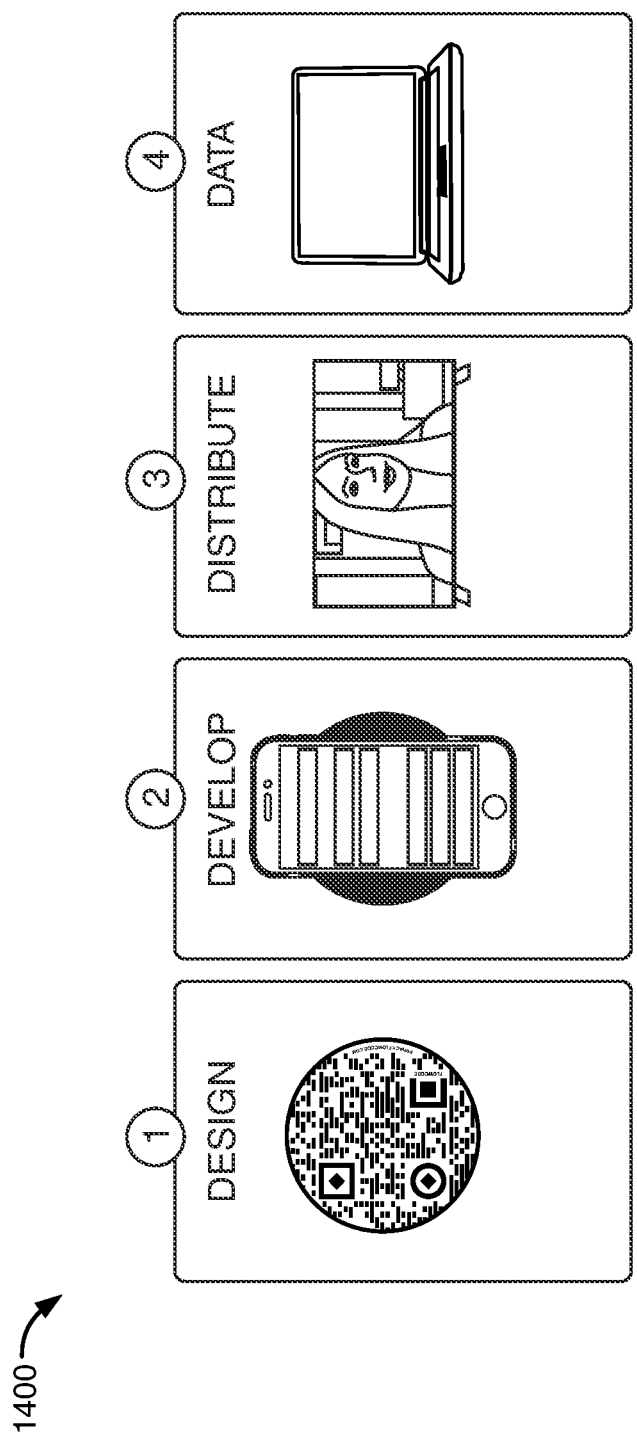
FIG. 14A shows an illustrative process in accordance with principles of the disclosure.

FIG. 14A shows illustrative steps and apparatus that may be utilized to embed an MRL into a video frame or other digital media. At step 1, an MRL is designed based on user input design choices. An MRL generator may ensure that an MRL includes the design choices entered by the user and is reliably scannable. The MRL generator may change design choices entered by the user to ensure that generated MRL is reliably scannable. The MRL generator may produce a MRL that is optimized for scan-ability when presented within digital media.

The MRL generator may apply computational aesthetic techniques to define an aesthetic appearance associated with user entered design choices. The MRL generator may utilize artificial intelligence and machine learning techniques to create a reliably scannable machine-readable label that adheres to the computed aesthetic appearance associated with user entered design choices.

The generated MRL may be designed to be reliably scannable when displayed with a video frame or other electronic display of digital media. Scan reliability may be defined by a data zone that can be read within a threshold time (e.g., ≤100 milliseconds) by a threshold number of scanning devices. An illustrative threshold number of scanning devices may include scanning devices produced by different manufactures and controlled by different operating systems. Software emulators may be configured to mimic operation of one or more scanning devices. The threshold number of devices may include at least one scanning device from two manufacturers.

At step 2, a custom landing page is designed. The custom landing page may be linked to the MRL and presented in response to a viewer scan of the MRL. At step 3, the MRL is embedded into a resultant video file. Step 3 may include distribution of the resultant video or digital media files to content providers or directly to end-viewers. Step 3 may include a distributing of the resultant video files to viewers. For example, the resultant video file may be streamed to viewers over the internet or distributed to viewers via satellite transmission.

At step 4, scan activity and associated viewer scans of the MRL and interaction with the custom landing page are monitored. Step 4 may utilize data and analytics platform 503 (shown in FIG. 5) to present performance metrics 507 computed based on viewer scanning activity or viewer action taken after scanning an MRL. Performance metrics may be generated for a specific template, specific video file, specific MRL or any other suitable attribute. For example, performance metrics may show a user of interface 802 best practices for designing a particular template.

Illustrative best practices may include an amount of time a template and/or MRL should be visible in a resultant video file to achieve a threshold number of viewer scans. As a further example, performance metrics may show that despite obscuring underlying pre-existing content, a template associated with a larger size MRL may be associated with a relatively higher level of viewer engagement compared to a template associated with a smaller size MRL (e.g., options shown in 815). Performance metrics may indicate how a template performs for a given scanning device or when embedded in resultant video file distributed to a target demographic group.

Figure 14B:
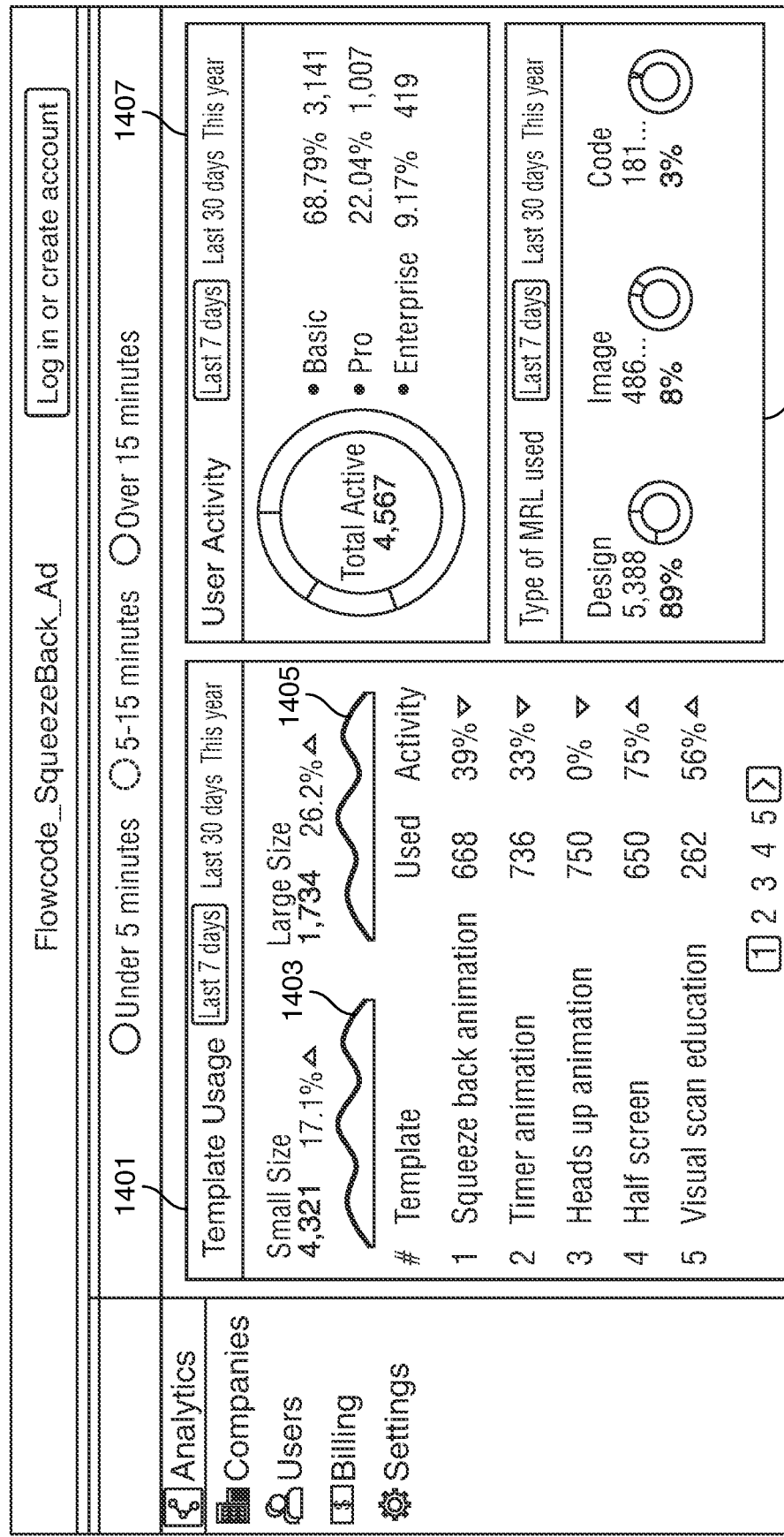
FIG. 14B shows illustrative output generated by a software tool in accordance with principles of the disclosure.

FIG. 14B shows illustrative performance metrics 1402. Performance metrics 1402 may be generated for resultant video files having a threshold length such as under 5 minutes, between 5-15 minutes and over 15 minutes. Performance metrics 1402 include usage 1404 of templates (e.g., shown in FIGS. 7A and 7B) by systems users. Usage 1404 may include discrete usage rates for large and small size templates.

Performance metrics 1402 include user activity 1407. Usage 1404 shows user of illustrative templates shown in FIG. 7B (item 704). User activity 1407 shows user activity across access to differing levels of functionality (e.g., basic, pro, enterprise). For example, "basic" users may not have access to analytics shown in FIG. 7D.

Performance metrics 1402 include usage of different MRL types. Illustrative MRL types include custom designed MRLs, MRLs that include embedded images and MRLs that do not include any aesthetic manipulations. A unique identifier encoded in an MRL may identify an MRL type. Performance metrics 1402 may be used to formulate machine generated recommendations shown in FIG. 7D.

Figure 14C:
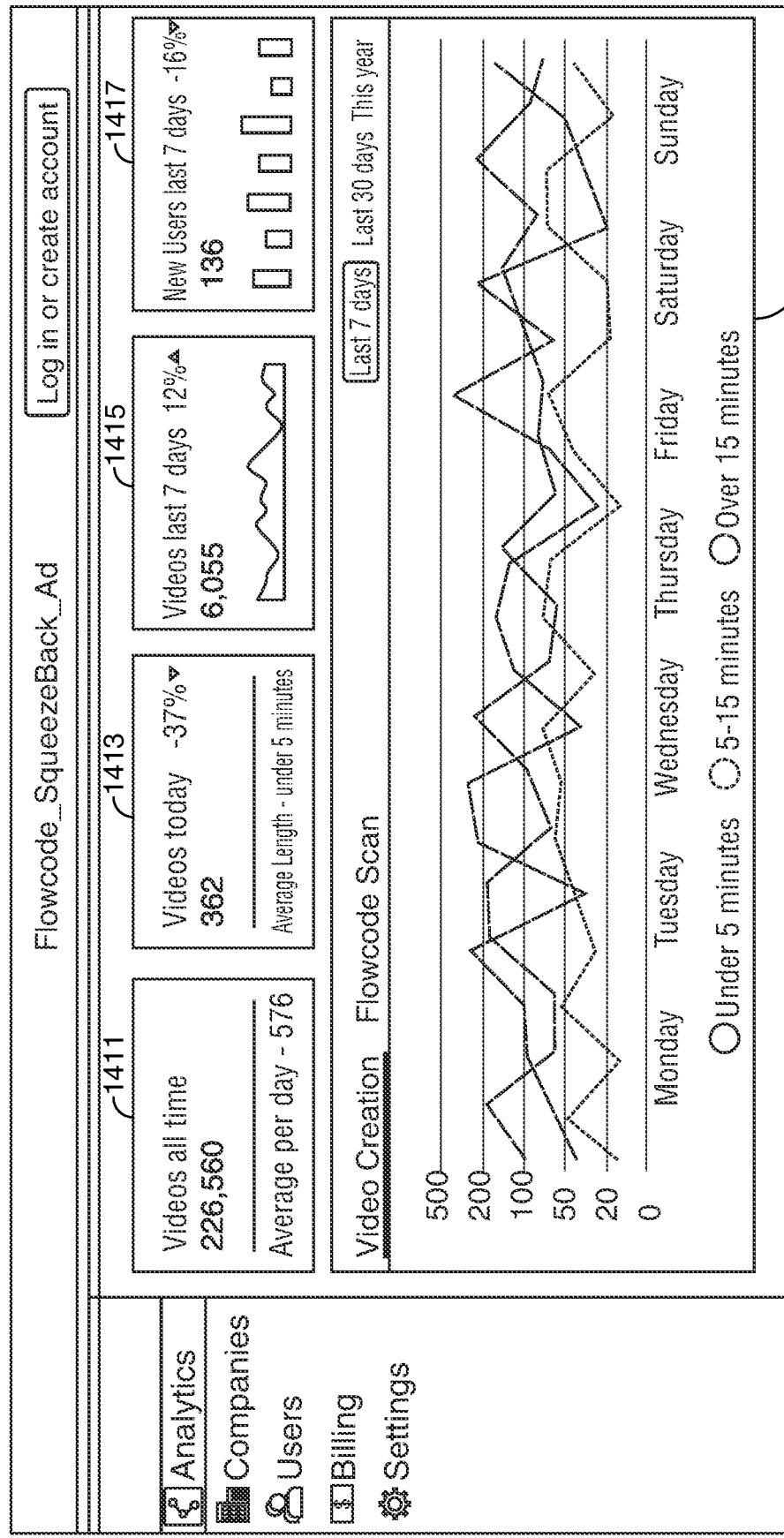
FIG. 14C shows illustrative output generated by a software tool in accordance with principles of the disclosure.

FIG. 14C shows illustrative performance metrics 1404. Performance metrics 1404 include total number of resultant video files generated 1411. Performance metrics 1404 include resultant video files generated today 1413. Performance metrics 1404 include resultant video files generated last week 1415. Performance metrics 1404 include analytics tracking creation of resultant video files over any suitable time period. Performance metrics 1404 include graphical representation of resultant video creation 1419.

Figure 15A:
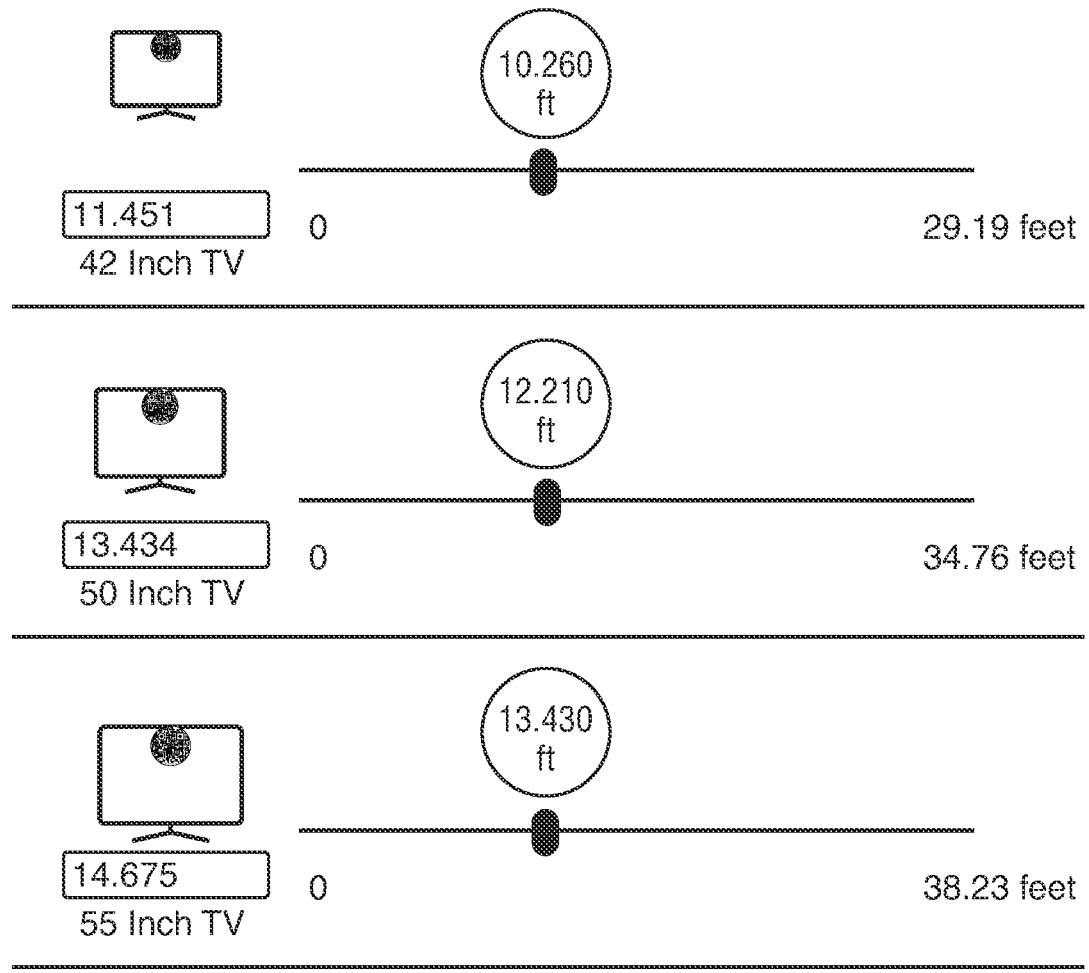
FIGS. 15A and 15B show illustrative features of a software tool in accordance with principles of the disclosure.
Figure 15B:
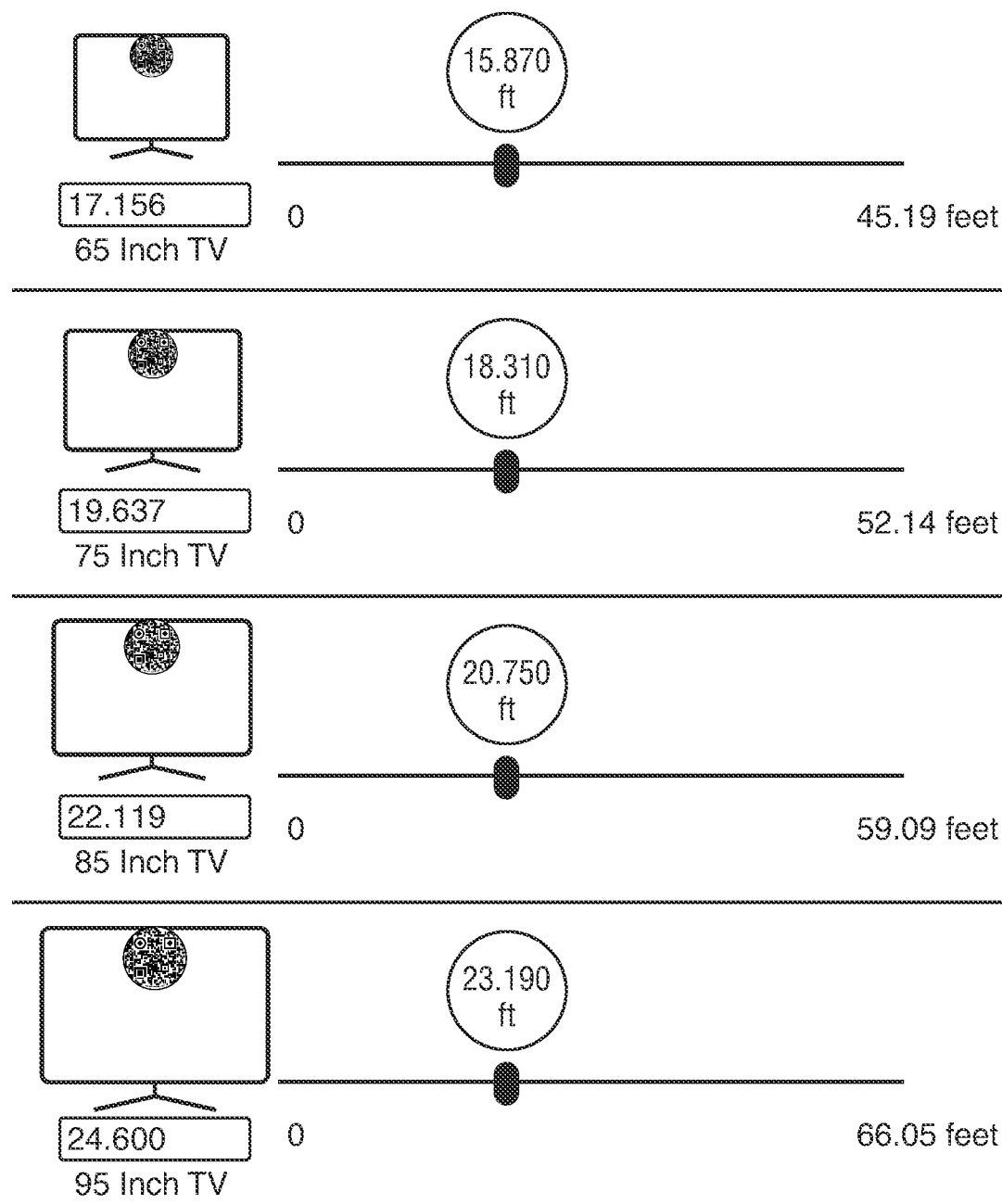

FIGS. 15A and 15B show illustrative views 1500 and 1502 of a software MRL testing tool. The software testing tool generates outputs that define dimensions for an MRL that will be reliably scannable when displayed within digital media such as a resultant video file. View 1500 shows three exemplary inputs, Option 1, Option 2 and Option 3. When a user provides a value for any one of the inputs, the software testing tools generates dimensions of a reliably scannable MRL for the given input.

View 1500 shows that using Option 1 a user may enter a desired percentage of a screen that should be occupied by a MRL displayed on the screen. Based on the entered percentage, the software testing tool may compute MRL dimensions for a plurality of illustrative screen sizes. Views 1500 and 1502 show that the software testing tool also stimulates a display of the generated MRL dimensions relative to screen size. Other embodiments of the software testing tool may include smaller (e.g., for mobile devices) or larger screen sizes than the screen sizes shown in views 1500 and 1502.

Views 1500 and 1502 show that based on the entered percentage, the software testing tool computes a maximum distance away from each size screen that an MRL, having the computed dimensions, will be reliably scannable. For example, view 1500 shows that for a percentage value of 38.558 entered into Option 1, the software testing tool has computed that for a 55-inch screen, a reliably scannable MRL should have a data zone that is 14.675 inches in height and 14.675 inches in width. View 1500 also shows that an MRL having a data zone that is 14.675 inches square will be reliably scannable from a distance of 13.430 feet away from the 55-inch screen. FIG. 1 shows width and height of illustrative data zone 101.

Output of the software testing tool may be piped to a MRL generator. The MRL generator may produce a MRL having the dimensions computed by the software testing tool. The MRL generator may produce an environmental zone and position detection patterns for the MRL based on the dimensions of the data zone computed by the software testing tool.

Views 1500 and 1502 show that the software testing tool generates outputs for a plurality of screen sizes. The outputs of the software testing tool may be used to generate a plurality of resultant video files that each include an embedded MRL that is reliably scannable on one of the plurality of screen sizes shown in views 1500 and 1502. A content provider may distribute each resultant video file to viewers having or expected to view the resultant video file on the corresponding screen sizes.

View 1500 shows that using Option 2 a user may upload an image of an MRL. Based on the uploaded image, the software testing tool may compute dimensions of an MRL depicted in the uploaded image. The software testing tool may show the computed dimensions and a maximum distance from each screen size that the MRL will be reliably scannable.

In some embodiments, the software testing tool may receive a MRL image from a MRL generator. For example, MRL generator may generate a MRL based on user entered design choices. The generated MRL may be input into the software testing tool to test scan reliability of the generated MRL. Based on outputs of the software testing tool (e.g., dimensions, distance from screen, percentage of screen), the user may be informed that the generated MRL may not achieve a threshold level of scan reliability.

In some embodiments, after determining that the MRL generated based on the user entered design choices does not achieve a threshold level of scan reliability, one or more of the user entered design choices may be automatically altered to generate an adjusted MRL that does achieve the threshold level of scan reliability. The system may apply computational aesthetic techniques to define an aesthetic appearance associated with the user's entered design choices. The system may alter the user's entered design choice to generate an adjusted MRL that achieves the threshold level of scan reliability and maintains the aesthetic appearance computed based on the user's entered design choices.

The software testing tool described in connection with views 1500 and 1502 may allow for tuning of MRL dimensions based on screen size and based on how far away from a screen a viewer is expected to be positioned. For example, statistical data may show that for a given population, an average screen size of a television viewer is 42 inches, and viewers are typically positioned 6-8 feet away from the screen. The software testing tool may generate MRLs that are reliable scannable when presented on the average size screen of a television viewer (e.g., 42 inches), to television viewers expected to be sitting up to 8 feet away from the screen.

In some embodiments, the software testing tool described in connection with views 1500 and 1502 allow a user to input a device type that will be used to display an MRL. A device type may be associated with a threshold screen size. For example, a device type corresponding to a desktop computer may be associated with a 27" screen. A device type associated with a television, may be associated with a 42" screen. A device type associated with a mobile device or tablet may be associated with a 10" screen. Based on an input device type, the software testing tool may output dimensions for a data zone of an MRL that achieves a threshold level of scan-ability on the input device type. Based on an input device type, the software testing tool may output maximum and minimum dimensions for a data zone of an MRL that achieves a threshold level of scan-ability on the input device type. Dimensions of a data zone may include width and length of the data zone.

Figure 16:
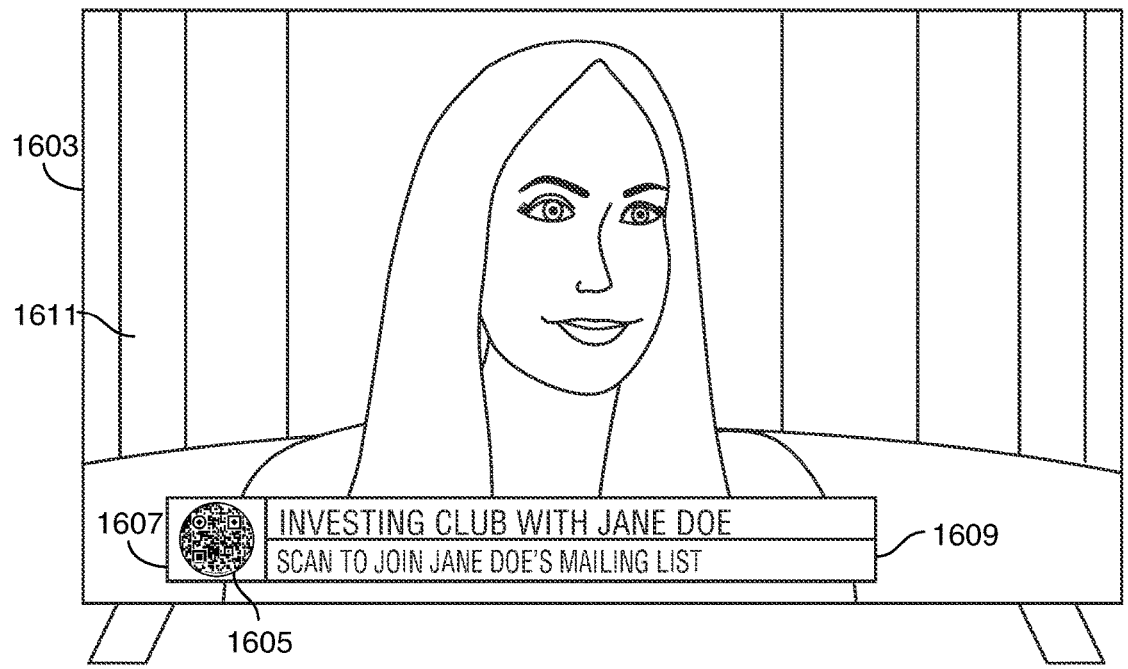
FIG. 16 shows illustrative output generated by a software tool in accordance with principles of the disclosure.

FIG. 16 shows illustrative outputs generated by the software testing tool described in connection with FIGS. 15A and 15B. FIG. 16 shows that utilizing Option 2 a user has uploaded the image file titled "investing_club.jpg". The uploaded image file includes MRL 1605. Outputs 1601 show that the software testing tool has computed a size of MRL 1605 in the uploaded image and a maximum scan distance of MRL 1605 when displayed on a plurality of screen sizes.

View 1600 shows that MRL 1605 has been embedded into video frame 1603 of a resultant video file. MRL 1605 is positioned within section 1607. Section 1607 also includes CTA text 1609 positioned alongside MRL 1605. Section 1607 may be created and embedded in video frame 1603 by software tools accessible via user interface 802 (shown above in FIGS. 8-13). For example, MRL 1650 may include a unique logo, color scheme or other branding that is associated with a producer of content 1611.

The software tools accessible via interface 802 may position section 1607 within video frame 1603 such that only background aspects of pre-existing content 1611 are obscured by section 1607. In some embodiments, the software tools accessible via interface 802 may locate one or more video frames in a video file where background aspects occupy an area (e.g., a buffer zone) within each video frame that is large enough to include section 1607 without obscuring non-background pre-existing content of the video frame(s).

Figure 17:
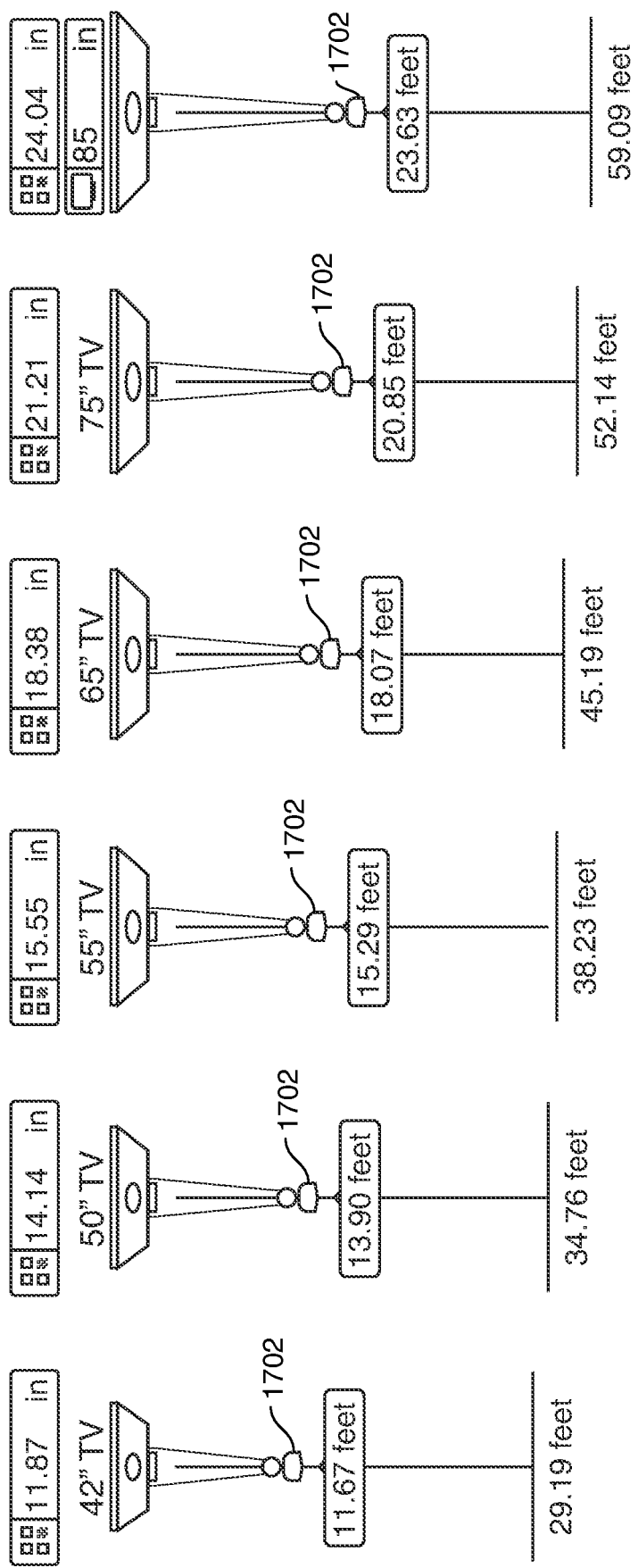
FIG. 17 shows illustrative features of a software tool in accordance with principles of the disclosure.

FIG. 17 shows illustrative visualization tool 1700 for viewing outputs generated by the software testing tool described in connection with FIGS. 15A and 15B. Visualization tools 1700 shows a position of illustrative viewer 1702 relative to different size screens. Viewer 1702 may be dragged closer or further away from a screen. Based on a distance between viewer 1700 and a screen, the software testing tool may compute a target size of an MRL that will be reliably scannable from the position of viewer 1700 on each of the different size screens.

In some embodiments, different size MRLs may be embedded in a resultant video file. For example, the resultant video file may include a first size MRL that is displayed for a first duration alongside images, call-to-action text or educational instructions. The resultant video file may include a second, larger size MRL that is displayed for a second duration. The second larger size MRL may be displayed during the second duration without any images, call-to-action text or educational instructions. The second larger size MRL may occupy a larger percentage of a screen than the first size MRL.

The autonomous MRL scanning software tool may track scan-ability of the first and second size MRLs. Analytics may be generated comparing and contrasting scan-ability of the first and second size MRLs. Other software tools, such as a redirect service may track viewer scans of the first and second size MRLs. Analytics may be generated comparing and contrasting scan-ability of the first and second size MRLs to viewer scans of the first and second size MRLs. Analytics may be generated determining an optimized size of an MRL to maximize scan-ability and viewer scans. Analytics may be generated determining an optimized duration of time an MRL should be displayed to maximize scan-ability and viewer scans.

Figure 18:
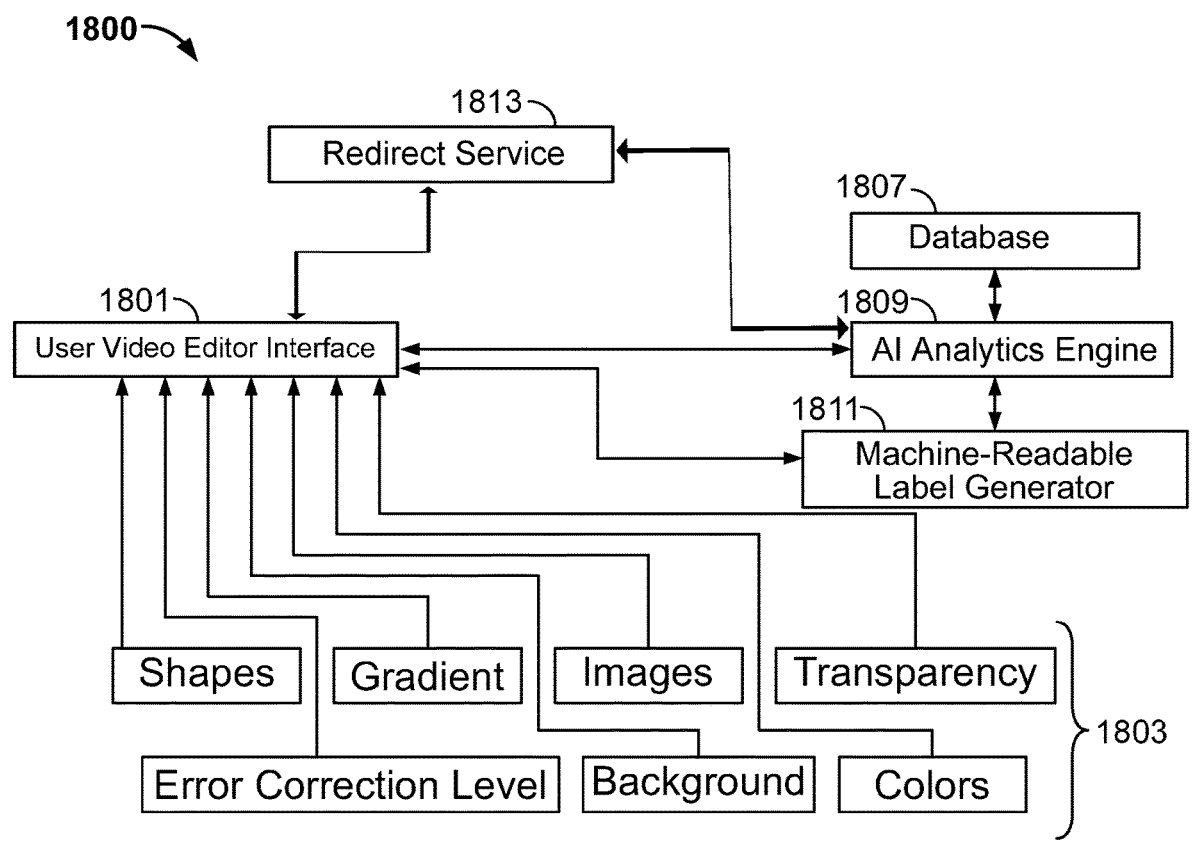
FIG. 18 shows an illustrative system in accordance with principles of the disclosure.

FIG. 18 shows illustrative system 1800. System 1800 includes components 1801, 1803, 1807, 1809, 1811 and 1813. Components of system 1800 may include a processor circuit. The processor circuit may control overall operation of system 1800 or one or more of components 1801, 1803, 1807, 1809, 1811 and 1813. The processor circuit may include hardware, such as one or more integrated circuits that form a chipset. The hardware may include digital or analog logic circuitry configured to perform any suitable (e.g., logical) operation.

Components of system 1800 may include cloud computing and virtualization implementations of software. Such implementations may be designed to run on a physical apparatus supplied externally by a hosting provider, a client, or other virtualized platform. Components may be operational with distributed computing environments where tasks are performed by remote processing devices that are linked through a communications network. In a distributed computing environment, program modules may be located in both local and remote computer storage media including memory storage devices. Components may rely on a network of remote servers hosted on the Internet to store, manage, and process data (e.g., "cloud computing" and/or "fog computing").

Components of system 1800 may include portable devices such as a laptop, tablet, smartphone, other "smart" devices or any other suitable device for receiving, storing, transmitting and/or displaying electronic information. Components of system 1800 may include, and may be operational with, numerous other general purpose or special purpose computing system environments or configurations. Examples of computing systems, environments, and/or configurations that may be suitable for use with this disclosure include, but are not limited to, personal computers, server computers, handheld or laptop devices, tablets, "smart" devices, mobile phones, multiprocessor systems, microcomputers, minicomputers, mainframe computers, distributed computing environments that include any of the above systems or devices, and the like.

Components of system 1800 may be produced by different manufacturers. Components of system 1800 may capture and process data in different formats. For example, components may use different data structures to store captured data. Components of system 1800 may utilize different communication protocols to transmit captured data or communicate with other systems. Despite such operational differences, components of system 1800 may be configured to operate substantially seamlessly. Interoperability may allow a user to enter design choices using a first system, utilize software running on a second system to generate a resultant video file, and view performance metrics associated with an MRL in the resultant video file formulated by a third system.

Components of system 1800 include user interface ("UI") 1801. UI 1801 may include software tools described in connection with FIGS. 7A-13. UI 1801 may interact with AI analytics engine 1809. AI analytics engine 1809 may formulate performance metrics and recommended practices for creating a resultant video file using UI 1801. AI analytics engine 1809 may store performance metrics and recommended practices in database 1807. Performance metrics and recommended practices formulated by AI analytics engine 1809 and stored in database 1807 may be accessed via UI 1801.

AI analytics engine 1809 may formulate performance metrics and recommended practices based on scans of MRLs detected and processed by redirect service 1813. Redirect service 1813 may be a cloud-based application hosted on a remote computer server. Redirect service 1813 may formulate content or trigger an action in response to detecting a scan of an MRL.

Based on information encoded in a scanned MRL, a scanning device may be connected to redirect service 1813. Redirect service 1813 may be associated the information encoded in the scanned MRL with a resultant video file. Based on information encoded in a scanned MRL, redirect service 1813 may associate the scanned MRL with a template used to create the resultant video file. In some embodiments, redirect service 1813 may provide AI analytics engine 1809 with information encoded in a scanned MRL. Based on the information encoded in the scanned MRL, AI analytics engine 1809 may associate the scanned MRL with a resultant video file and template used to create the resultant video file. AI analytics engine 1809 may associate the information encoded in a scanned MRL with any suitable user inputs (such as exemplary user inputs 1803) captured by UI 1801 during creation of resultant video file.

UI 1801 may utilize MRL generator 1811 to construct an MRL in accordance with user input design choices, such as exemplary user inputs 1803. In some embodiments, AI analytics engine 1809 may automatically adjust user input design choices received by UI 1801. AI analytics engine 1809 may issue instructions to MRL generator 1811 and UI 1801 based on performance metrics and recommended practices formulated by AI analytics engine 1809. The instructions issued by AI analytics engine 1809 may alter one or more user entered design choices, such as exemplary user inputs 1803.

Thus, methods and apparatus for DYNAMIC EMBEDDING OF MACHINE-READABLE CODES WITHIN VIDEO AND DIGITAL MEDIA are provided. Persons skilled in the art will appreciate that the present disclosure can be practiced by other than the described embodiments, which are presented for purposes of illustration rather than of limitation, and that the present disclosure is limited only by the claims that follow.

What is claimed is:
1. A method for embedding a machine-readable label ("MRL") into a video, the method comprising:
   detecting an upload of a video file to a remote computer server;
   receiving a set of design choices for the MRL;
   defining a segment of the video file;
   creating a space within a video frame included in the segment;
   generating the MRL based on the set of design choices;
   inserting the MRL into the space; and rendering a resultant video file that includes the MRL embedded into the space.

2. The method of claim 1, further comprising resizing pre-existing content included in the segment wherein, after the resizing, the pre-existing content does not overlap the space, the resizing comprising shrinking or cropping the pre-existing content.

3. The method of claim 1, wherein the set of design choices defines a target position of the MRL within the video frame relative to an outer border of the video frame.

4. The method of claim 1 further comprising conducting automated scan-ability testing of the MRL and determining whether the MRL will achieve a threshold level of scan-ability after the MRL is embedded into the space.

5. The method of claim 4, the automated scan-ability testing of the MRL comprising:
  detecting the MRL embedded within the resultant video file;
  determining a height and width of a data zone of the MRL embedded within the resultant video file; and
  calculating whether the MRL embedded within the resultant video file is scannable at a threshold distance from a target size screen that presents the resultant video file.

6. The method of claim 5, further comprising:
  detecting that the MRL does not achieve the threshold level of scan-ability when displayed on the target size screen; and
  generating a replacement MRL that achieves the threshold level of scan-ability for the target size screen.

7. The method of claim 4 further comprising:
  detecting that the MRL does not achieve the threshold level of scan-ability; and
  generating a replacement MRL by automatically adjusting one or more display properties of pre-existing content in the video frame such that that replacement MRL achieves the threshold level of scan-ability.

8. The method of claim 4 wherein the automated scan-ability testing comprises simulating extracting of data encoded in the MRL from a target distance when the resultant video file is presented electronically on a target screen size.

9. The method of claim 1 wherein the set of design choices is a first set, the segment a first segment and the MRL a first MRL, the method further comprising:
  defining a second segment of the video file;
  receiving a second set of design choices;
  generating a second MRL based on the second set of design choices; and
  rendering the resultant video file that includes the first MRL and the second MRL.

10. The method of claim 1, further comprising:
  determining one or more visual properties associated with pre-existing content included in the segment; and
  before rendering the resultant video file, automatically adjusting the set of design choices for the MRL such that the MRL achieves a threshold level of scan-ability after the rendering.

11. The method of claim 1 further comprising automatically determining one or more of the set of design choices based on maximizing one or more performance metrics for the MRL when the resultant video file is distributed to viewers.

12. The method of claim 1 further comprising automatically maximizing a size of the MRL for a target device type.

13. The method of claim 1 wherein the set of design choices for the MRL includes: dimensions of a data zone of the MRL, contrast between colors applied to modules in the data zone, brightness of the colors, dimensions of a buffer area around an environmental zone of the MRL, or a location of position detection patterns of the MRL.

14. The method of claim 1, further comprising, after rendering the resultant video file, adjusting a scan destination presented in response to a scan of the MRL included in the resultant video file.

15. The method of claim 14, further comprising adjusting the scan destination based on one or more scan event details.

16. The method of claim 1 further comprising:
  automatically generating an overlay based on the set of design choices for the MRL and one or more visual properties of pre-existing content included in the segment; and
  inserting the overlay into the space.

17. The method of claim 1 further comprising:
  generating a first plurality of MRLs and each MRL in the first plurality includes the set of design choices and a unique identifier; and
  generating a second plurality of resultant video files wherein each resultant video file in the second plurality includes a corresponding one of the MRLs in the first plurality.

18. A system for dynamically embedding a machine-readable label ("MRL") in a video, the system comprising machine-readable instructions stored on a non-transitory memory, the machine-readable instructions, when executed by one or more processors, cause the one or more processors to:
  receive a user selection of a time window within a video file;
  generate a machine-readable label ("MRL") based on a set of user entered design choices;
  embed the MRL within a video frame of the video file; and
  render a resultant video file that includes the MRL within the video frame.

19. The system of claim 18, wherein the machine-readable instructions when executed by the one or more processors, further cause the one or more processors to:
  test a scan-ability level of the MRL generated based on the set of user entered design choices; and
  when the MRL does not achieve a threshold scan-ability level, generate a replacement MRL that achieves the threshold scan-ability level.

20. The system of claim 18, the machine-readable instructions, when executed by one or more processors, further cause the one or more processors to:
  formulate an overlay based on a template selected by the user; and
  insert the overly into the video frame.

21. The system of claim 18, the machine-readable instructions, when executed by one or more processors, further cause the one or more processors to:
  receive, from a first mobile device, a first scan of the MRL;
  in response to the first scan, redirect the first mobile device to a first landing page;
  receive, from a second mobile device, a second scan of the MRL; and
  in response to the second scan, redirect the second mobile device to a second landing page.

22. The system of claim 18, wherein the set of design choices is a first set, the machine-readable instructions when executed by the one or more processors, further cause the one or more processors to formulate an overlay by:
  receiving a first user selection of a first template;

receiving a second user selection of a saved section of a second template;

automatically resizing the saved section of the second template based on dimensions of a target section of the first template; and after the resizing, inserting the resized saved section into the target section.

23. The system of claim 22, wherein the machine-readable instructions when executed by the one or more processors, further cause the one or more processors to animate the MRL included in the resultant video file.

24. The system of claim 18, the machine-readable instructions when executed by the one or more processors, further cause the one or more processors to:

determine area of the video frame that includes foreground pre-existing content; and position the MRL within the video frame such that the MRL does not obscure the foreground pre-existing content.

25. The system of claim 18 the machine-readable instructions when executed by the one or more processors, further cause the one or more processors to generate the MRL based on obtaining a target level of scan-ability for the MRL when the resultant video file is displayed on a target screen size.

26. A system for dynamically embedding a machine-readable label ("MRL") in a video file, the system comprising one or more processors that execute machine-readable instructions, the machine-readable instructions, when executed by the one or more processors, cause the system to:

receive a user selection of a time window within the video file;

generate a plurality of machine-readable labels ("MRLs") wherein, each of the plurality of MRLs is generated based on a set of user entered design choices and each of the MRLs includes a machine-generated unique identifier; and render a plurality of resultant video files that each include at least one of the plurality of MRLs within a video frame included in the time window.

27. The system of claim 26, the machine-readable instructions when executed by the one or more processors, further cause the system to render the plurality of resultant video file in accordance with video format requirements of a target media distribution platform.

28. The system of claim 26, the machine-readable instructions when executed by the one or more processors, further cause the system to generate each of the plurality of MRLs in accordance with a target screen size that will display each of the plurality of MRLs.

29. The system of claim 26, wherein, each of the plurality of MRLs when scanned, loads a target landing page corresponding to the unique identifier in the scanned MRL.

30. The system of claim 26, the machine-readable instructions when executed by the one or more processors, further cause the system to:

associate a first landing page with a first of the plurality of MRLs;

associate a second landing page with a second of the plurality of MRLs; and change the first landing page based on a number of viewer impressions associated with the second landing page.

* * * * *